(12) United States Patent
Kuwahara et al.

(10) Patent No.: US 7,457,215 B2
(45) Date of Patent: Nov. 25, 2008

(54) METHOD FOR REPRODUCING DATA AND AN APPARATUS FOR RECORDING AND REPRODUCING DATA

(75) Inventors: Masashi Kuwahara, Ibaraki (JP); Takayuki Shima, Ibaraki (JP); Junji Tominaga, Ibaraki (JP); Takashi Kikukawa, Tokyo (JP); Narutoshi Fukuzawa, Tokyo (JP); Tatsuhiro Kobayashi, Tokyo (JP)

(73) Assignees: National Institute of Advanced Industrial Science and Technology, Tokyo (JP); TDK Corporation, Tokyo (JP)

(*) Notice: Subject to any disclaimer, the term of this patent is extended or adjusted under 35 U.S.C. 154(b) by 857 days.

(21) Appl. No.: 10/929,892

(22) Filed: Aug. 30, 2004

(65) Prior Publication Data

US 2005/0117478 A1    Jun. 2, 2005

(30) Foreign Application Priority Data

Oct. 31, 2003    (JP) ............................... 2003-372020

(51) Int. Cl.
*G11B 7/00* (2006.01)
(52) U.S. Cl. .................................................. 369/47.53
(58) Field of Classification Search .............. 369/47.53, 369/47.51, 59.11
See application file for complete search history.

(56) References Cited

U.S. PATENT DOCUMENTS

| | | | | |
|---|---|---|---|---|
| 5,474,874 A | * | 12/1995 | Asai et al. ................. | 430/275.1 |
| 6,430,128 B1 | * | 8/2002 | Kato et al. ................ | 369/47.53 |
| 6,965,556 B1 | * | 11/2005 | Kikukawa et al. ........... | 369/284 |
| 7,016,290 B2 | * | 3/2006 | Nakano et al. ........... | 369/110.04 |
| 7,166,346 B2 | * | 1/2007 | Kim et al. .................. | 428/64.4 |
| 2002/0181365 A1 | * | 12/2002 | Nakajo ..................... | 369/47.53 |
| 2002/0191527 A1 | * | 12/2002 | Kikukawa et al. ........... | 369/116 |
| 2004/0048075 A1 | * | 3/2004 | Tominaga et al. ........... | 428/434 |
| 2004/0264333 A1 | * | 12/2004 | Chang et al. .............. | 369/59.2 |
| 2005/0152247 A1 | * | 7/2005 | Minechika et al. ........ | 369/47.53 |
| 2005/0237912 A1 | * | 10/2005 | Kikukawa et al. ......... | 369/275.4 |

OTHER PUBLICATIONS

*Extended Abstracts* (The 61$^{th}$ Autumn Meeting, 2003); The Japan Society of Applied Physcis No. 3, Aug. 30-Sep. 2, 2003, JSAP Catalog No. AP 031129-03, 5 pg.

* cited by examiner

*Primary Examiner*—Thang V Tran
(74) *Attorney, Agent, or Firm*—Seed IP Law Group PLLC

(57) ABSTRACT

A method for reproducing data according to the present invention is adapted for reproducing data recorded in an optical recording disc including a multi-layered body formed by forming a decomposition reaction layer containing noble metal oxide as a primary component and a light absorption layer so as to sandwich a dielectric layer therebetween by irradiating a laser beam onto the optical recording disc and forming a recording mark train including at least one of a recording mark having a length shorter than a resolution limit and a blank region having a length shorter than the resolution limit therein, and is constituted by changing the read power Pr of the laser beam in accordance with a readout linear velocity at which data are to be reproduced from the optical recording disc. According to the thus constituted method for reproducing data, even in the case where the length of a recording mark or the length of a blank region between neighboring recording marks is shorter than the resolution limit, it is possible to record and reproduce a recording mark train including these recording marks and the blank regions. Therefore, this method can be applied to an optical recording medium whose storage capacity is markedly increased.

8 Claims, 12 Drawing Sheets

METHOD FOR REPRODUCING DATA AND AN APPARATUS FOR RECORDING AND REPRODUCING DATA

BACKGROUND OF THE INVENTION

The present invention relates to a method for reproducing data recorded in an optical recording disc and an apparatus for recording data in and reproducing data from an optical recording disc and, particularly, to a method for reproducing data and an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

DESCRIPTION OF THE PRIOR ART

Optical recording discs such as the CD, DVD and the like have been widely used as recording media for recording digital data and a optical recording disc that offers improved recording density and has an extremely high data transfer rate has been recently developed.

In such an optical recording disc, the storage capacity of the optical recording disc is improved by reducing a wavelength λ of a laser beam used for recording and reproducing data and increasing a numerical aperture NA of an objective lens, thereby reducing the diameter of the laser beam spot.

In an optical recording disc, in the case where the length of a recording mark formed in the optical recording disc and the length between neighboring recording marks, namely, the length of a region (hereinafter referred to as "a blank region") where no recording mark is formed are shorter than the resolution limit, data cannot be reproduced from the optical recording disc.

The resolution limit is determined by the wavelength λ of a laser beam and the numerical aperture NA of an objective lens for converging the laser beam and in the case where the frequency of repetition of a recording mark and a blank region, namely, the spatial frequency is equal to or larger than 2NA/λ, data recorded in the recording mark and the blank region cannot be read.

Therefore, the length of the recording mark and the blank region corresponding to the spatial frequency which can be read both become equal to or larger than λ/4NA and in the case where an objective lens having a numerical aperture NA is used to converge a laser beam having a wavelength λ on the surface of an optical recording disc, a recording mark having a length of λ/4NA and a blank region having a length of λ/4NA are the shortest recording mark and the shortest blank region which can be read.

Thus when data recorded in an optical recording disc are to be reproduced, there exists a resolution limit within which data can be read and the length of a recording mark and the length of a blank region which can be read are restricted. Therefore, if a recording mark having a length shorter than the resolution limit and a blank region having a length shorter than the resolution limit are formed in an optical recording disc, thereby recording data therein, the thus recorded data cannot be reproduced, so that the length of a recording mark and the length of a blank region which can be formed for recording data in an optical recording disc are inevitably restricted and a recording mark having a length shorter than the resolution limit and a blank region having a length shorter than the resolution limit are not normally formed in an optical recording disc to record data therein.

Therefore, in order to increase the storage capacity of an optical recording disc, it is required to shorten the wavelength λ of the laser beam used for reproducing data or increase the numerical aperture NA of the objective lens, thereby decreasing the resolution limit so that data consisting of a recording mark having a shorter length and a blank region having a shorter length can be reproduced.

However, there is a limit to how far the wavelength λ of the laser beam used for reproducing data can be shortened and how far the numerical aperture NA of the objective lens can be increased, so that the increase in the storage capacity of an optical recording disc that can be achieved by decreasing the resolution limit is limited.

Further, even if the storage capacity of an optical recording disc can somehow be increased, this alone is not sufficient because it is further necessary to ensure that a reproduced signal having good signal characteristic can be obtained by reproducing the data recorded in the optical recording disc.

SUMMARY OF THE INVENTION

It is therefore an object of the present invention to provide a method for reproducing data recorded in an optical recording disc which can record data therein and reproduce data therefrom even in the case where the lengths of a recording mark and a blank region between neighboring recording marks which constitute the data are shorter than the resolution limit and whose storage capacity can be markedly increased.

It is another object of the present invention to provide an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

The above objects of the present invention can be accomplished by a method for reproducing data recorded in an optical recording disc comprising a multi-layered body formed by forming a decomposition reaction layer containing noble metal oxide as a primary component and a light absorption layer so as to sandwich at least a dielectric layer therebetween by irradiating a laser beam onto the optical recording disc formed with a recording mark train including at least one of a recording mark having a length shorter than a resolution limit and a blank region having a length shorter than the resolution limit therein, a power of the laser beam being changed in accordance with a readout linear velocity at which data are to be reproduced from the optical recording disc.

In the present invention, the optical recording disc includes a multi-layered body formed by forming a decomposition reaction layer containing noble metal oxide as a primary component and a light absorption layer so as to sandwich at least a dielectric layer therebetween.

In the optical recording disc having such configuration, when the laser beam is irradiated thereonto, a void is formed and fine particles of noble metal precipitate into the void, thereby forming a recording mark in the decomposition reaction layer.

In a study done by the inventors of the present invention, it was found that in the case where data were recorded in the optical recording disc in this manner, even in the case where the length of a recording mark or the length of a blank region between neighboring recording marks constituting a recording mark train was shorter than the resolution limit, data recorded in the optical recording disc could be reproduced by converging the laser beam using an objective lens onto the optical recording disc via a light incidence plane of the laser beam.

Although it is not altogether clear why, in the case where the laser beam is irradiated onto the optical recording disc, the void is formed in the decomposition reaction layer and fine particles of noble metal precipitate into the void, thereby forming a recording mark in the decomposition reaction layer, it is possible to reproduce data recorded in the optical recording disc even in the case where the length of a recording mark or the length of a blank region between neighboring recording marks constituting a recording mark train is shorter than the resolution limit, it is reasonable to conclude that near-field light is generated by irradiating the laser beam for reproducing data onto the fine particles of noble metal and the resolution limit disappears or that the resolution limit becomes smaller due to the interaction between the fine particles of noble metal precipitated into the void and the laser beam irradiated onto the fine particles of noble metal.

Since data can be reproduced in this manner even in the case where the length of a recording mark or the length of a blank region between neighboring recording marks constituting a recording mark train is shorter than the resolution limit, data can be recorded in an optical recording disc with higher density and it is therefore possible to markedly increase the storage capacity of an optical recording disc.

In a further study done by the inventors of the present invention, it was found that in the case of varying the readout linear velocity at which data are to be reproduced from an optical recording disc when reproducing data recorded in the optical recording disc by forming a recording mark having a length shorter than the resolution limit and a blank region having a length shorter than the resolution limit in a decomposition reaction layer, the signal characteristics of the reproduced signal were not stable and the signal characteristics of the reproduced signal such as the C/N ratio became worse.

Generally, the readout linear velocity is often varied in accordance with the user's request or the like when data recorded in an optical recording disc are to be reproduced and, in particular, in the case of rotating the optical recording disc at a constant angular velocity, the readout linear velocity frequently varies depending upon the position of the laser beam irradiated onto the optical recording disc even if the user does not intentionally vary the readout linear velocity. In order to reproduce data recorded in an optical recording disc in a desired manner even in such a case, it is necessary to control the read power Pr of the laser beam to a level suitable for the instantaneous readout linear velocity.

According to the present invention, since the read power of the laser beam is changed in accordance with the readout linear velocity at which data are to be reproduced from an optical recording disc, it is possible to control the read power Pr of the laser beam to a level suitable for the instantaneous readout linear velocity and it is therefore possible to obtain a reproduced signal having good signal characteristics even in the case of varying the readout linear velocity.

In a preferred aspect of the present invention, the power of the laser beam is increased as the readout linear velocity becomes higher when data are to be reproduced from the optical recording disc.

In a study done by the inventors of the present invention, it was found that there was a linear relationship between the readout linear velocity at which data are to be reproduced and the optimum read power of the laser beam corresponding to the readout linear velocity in the case of reproducing data recorded in the optical recording disc by forming a recording mark having a length shorter than the resolution limit and a blank region having a length shorter than the resolution limit in the decomposition reaction layer and according to this preferred aspect of the present invention, since the power of the laser beam is increased as the readout linear velocity becomes higher when data are to be reproduced from the optical recording disc, it is possible to always obtain a reproduced signal having good signal characteristics even in the case of varying the readout linear velocity.

In a further preferred aspect of the present invention, the method for reproducing data comprises steps of determining an optimum read power of the laser beam at a first readout linear velocity and determining an optimum read power of the laser beam at a second readout linear velocity higher than the first readout linear velocity prior to reproducing data from the optical recording medium, and determining an optimum read power of the laser beam at a readout linear velocity between the first readout linear velocity and the second readout linear velocity based on the optimum read power of the laser beam at the first readout linear velocity and the optimum read power of the laser beam at the second readout linear velocity when data are to be reproduced from the optical recording disc.

In a further preferred aspect of the present invention, the method for reproducing data further comprises steps of forming a recording mark train including at least one of a recording mark having a length shorter than a resolution limit and a blank region having a length shorter than the resolution limit in the optical recording disc, thereby recording test data therein, reproducing the test data recorded in the optical recording disc, judging whether or not signal characteristics of a reproduced signal obtained by reproducing the test data satisfy reference conditions, and determining the optimum read power of the laser beam at the first readout linear velocity and the optimum read power of the laser beam at the second readout linear velocity based on the result of the judgment.

In a study done by the inventors of the present invention, it was found that in an optical recording disc constituted so that a recording mark having a length shorter than the resolution limit and a blank region having a length shorter than the resolution limit were formed, thereby recording data therein, data recorded therein could not be reproduced unless the read power of the laser beam was set higher than a predetermined power but signal characteristics of a reproduced signal became worse if the read power of the laser beam was set too high.

Therefore, in order to reproduce in a desired manner data recorded in the optical recording disc by forming a recording mark having a length shorter than the resolution limit and a blank region having a length shorter than the resolution limit, it is necessary prior to reproducing recorded data to control the read power of the laser beam to a level suitable for reproducing the recorded data.

According to this preferred aspect of the present invention, it is possible to control the level of a read power of the laser beam prior to reproducing recorded data so as to become a level suitable for reproducing the recorded data and it is therefore possible to reproduce data recorded in the optical recording disc by forming a recording mark having a length shorter than the resolution limit and a blank region having a length shorter than the resolution limit therein in a desired manner.

In the present invention, it is preferable for the noble metal oxide contained in the decomposition reaction layer of the optical recording disc as a primary component to be decomposed into noble metal and oxygen when the laser beam is irradiated onto the optical recording disc.

In the present invention, the noble metal oxide contained in the decomposition reaction layer of the optical recording disc is not particularly limited but oxide containing at least one noble metal selected from a group consisting of Ag, Pt and Pd is preferably selected from the viewpoint of easy formation of oxide and the efficiency of generating near-field light, and platinum oxide ($PtO_2$) is particularly preferable since the decomposition temperature thereof is high.

Platinum oxide ($PtO_2$) has a higher decomposition temperature than those of other noble metal oxides. Therefore, when a laser beam whose power is set to that for recording data is irradiated onto the optical recording disc, thereby forming a recording mark, since it is possible to prevent heat from transferring from a region of the decomposition reaction layer irradiated with the laser beam to other regions therearound and prevent a decomposition reaction of platinum oxide $PtO_2$ from occurring at regions other than the region irradiated with the laser beam, it is possible to form a void in the decomposition reaction layer, thereby forming a recording mark.

Further, since platinum oxide ($PtO_2$) has a higher decomposition temperature than those of other noble metal oxides, even in the case where a laser beam having a high power for reproducing data is irradiated onto the optical recording disc, thereby reproducing data, there is no risk of platinum oxide decomposing into platinum and oxygen. Therefore, even in the case of repeatedly reproducing data recorded in the optical recording disc, a void can be formed without change in the shape of a recording mark and a new void is not formed at regions other than a region where the recording mark is formed. Accordingly, it is possible to improve the reproduction durability of an optical recording disc.

In the present invention, in order to obtain a reproduced signal having a high C/N ratio even in the case where the length of a recording mark or the length of a blank region between neighboring recording marks is shorter than the resolution limit, it is preferable for x in the general formula of platinum oxide: $PtO_x$ to be equal to or larger than 0.5 and equal to or smaller than 4.0 and more preferable for x to be equal to or larger than 1.0 and smaller than 3.

In the present invention, in the case where silver oxide $AgO_y$ is employed as noble metal oxide, it is preferable for y to be equal to or larger than 0.5 and equal to or smaller than 1.5 and more preferable for y to be equal to or larger than 0.5 and equal to or smaller than 1.0.

In the present invention, the void is preferably formed in the decomposition reaction layer by oxygen gas generated when the laser beam is irradiated onto the optical recording disc.

In the present invention, it is preferable for each fine particle of platinum formed by the decomposition of platinum oxide to have a particle size smaller than the void to be formed in the decomposition reaction layer. In the case where each fine particle of platinum formed by the decomposition of platinum oxide has a particle size sufficiently smaller than the void to be formed in the decomposition reaction layer, it is possible to effectively prevent the shape of the void from being affected by fine particles of platinum precipitating into the void and prevent a recording mark from being undesirably deformed.

In the present invention, the light absorption layer is constituted so as to absorb a laser beam irradiated thereonto via a light transmission layer and generate heat.

In the case where the light absorption layer is constituted so as to absorb a laser beam irradiated thereonto via a light transmission layer and generate heat, even if the decomposition reaction layer is does not readily generate heat when the laser beam is irradiated thereonto, it is possible to decompose noble metal oxide contained in the decomposition reaction layer as a primary component into noble metal and oxygen by heat transferred from the light absorption layer. Therefore, even if the decomposition reaction layer is formed thin so as to be easily deformed or even if the decomposition reaction layer contains noble metal oxide having high light transmittance with respect to a laser beam, it is possible to decompose noble metal oxide in a desired manner by irradiating the laser beam onto the decomposition reaction layer, thereby forming a recording mark therein.

In the present invention, the light absorption layer preferably contains a material having a high absorption coefficient with respect to a laser beam and low thermal conductivity and more preferably contains at least one of Sb and Te.

In the present invention, as an alloy contained in the light absorption layer and containing at least one of Sb and Te, an alloy represented by the general formula: $(Sb_aTe_{1-a})_{1-b}M_b$ or $\{(GeTe)_c(Sb_2Te_3)_{1-d}\}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer becomes lower than the required value and the thermal conductivity thereof becomes lower than the required value.

The element M is not particularly limited but it is preferable for the element M to be at least one element selected from a group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy which contains at least one of Sb and Te and is contained in the light absorption layer is represented by the general formula: $\{(GeTe)_c(Sb_2Te_3)_{1-d}\}_dX_{1-d}$, it is preferable for c and d to be such that c is equal to or larger than $\frac{1}{3}$ and equal to or smaller than $\frac{2}{3}$ and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

In the present invention, it is preferable for the dielectric layer and the light absorption layer to be deformed when the laser beam is irradiated onto the optical recording disc, whereby the decomposition reaction layer is decomposed into noble metal and oxygen and the void is formed.

Since deformed regions of the dielectric layer and the light absorption layer have different optical characteristics from regions which are not deformed, it is possible to further improve the C/N ratio of the reproduced signal.

The above objects of the present invention can be also accomplished by an apparatus for recording and reproducing data adapted for irradiating a laser beam onto an optical recording disc comprising a multi-layered body formed by forming a decomposition reaction layer containing noble metal oxide as a primary component and a light absorption layer so as to sandwich at least a dielectric layer therebetween, forming a recording mark train including at least one of a recording mark having a length shorter than a resolution limit and a blank region having a length shorter than the resolution limit therein, thereby recording data therein, and reproducing the thus recorded data, the apparatus for recording and reproducing data comprising an irradiating means for irradiating the laser beam onto the optical recording disc and a control means for controlling a power of the laser beam, the control means being constituted so as to change a read power of the laser beam in accordance with a readout linear velocity at which data are to be reproduced from the optical recording disc.

In a preferred aspect of the present invention, the control means is constituted so as to increase the power of the laser beam as the readout linear velocity becomes higher when data are to be reproduced from the optical recording disc.

In a further preferred aspect of the present invention, the control means is constituted so as to determine an optimum read power of the laser beam at a first readout linear velocity and determine an optimum read power of the laser beam at a second readout linear velocity higher than the first readout linear velocity prior to reproducing data from the optical recording medium, and determine an optimum read power of the laser beam at a readout linear velocity between the first readout linear velocity and the second readout linear velocity based on the optimum read power of the laser beam at the first readout linear velocity and the optimum read power of the laser beam at the second readout linear velocity when data are to be reproduced from the optical recording disc.

In a further preferred aspect of the present invention, the control means is constituted so as to form a recording mark train including at least one of a recording mark having a length shorter than a resolution limit and a blank region having a length shorter than the resolution limit in the optical recording disc, thereby recording test data therein, reproduce the test data, judge whether or not signal characteristics of a reproduced signal obtained by reproducing the test data satisfy reference conditions, and determine the optimum read power of the laser beam at the first readout linear velocity and the optimum read power of the laser beam at the second readout linear velocity based on the result of the judgment.

The above and other objects and features of the present invention will become apparent from the following description made with reference to the accompanying drawings.

DESCRIPTION OF THE PREFERRED EMBODIMENTS

Figure 1:
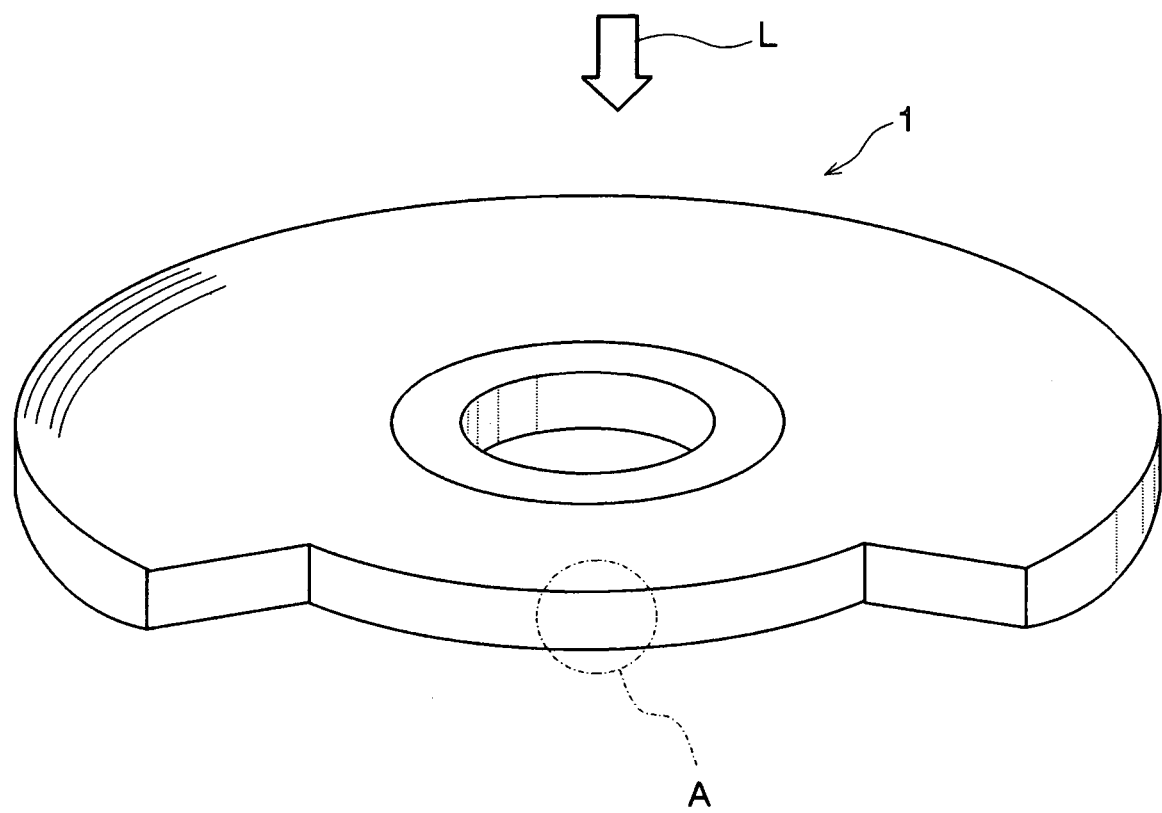
FIG. 1 is a schematic perspective view showing an optical recording disc that is a preferred embodiment of the present invention.
Figure 2:
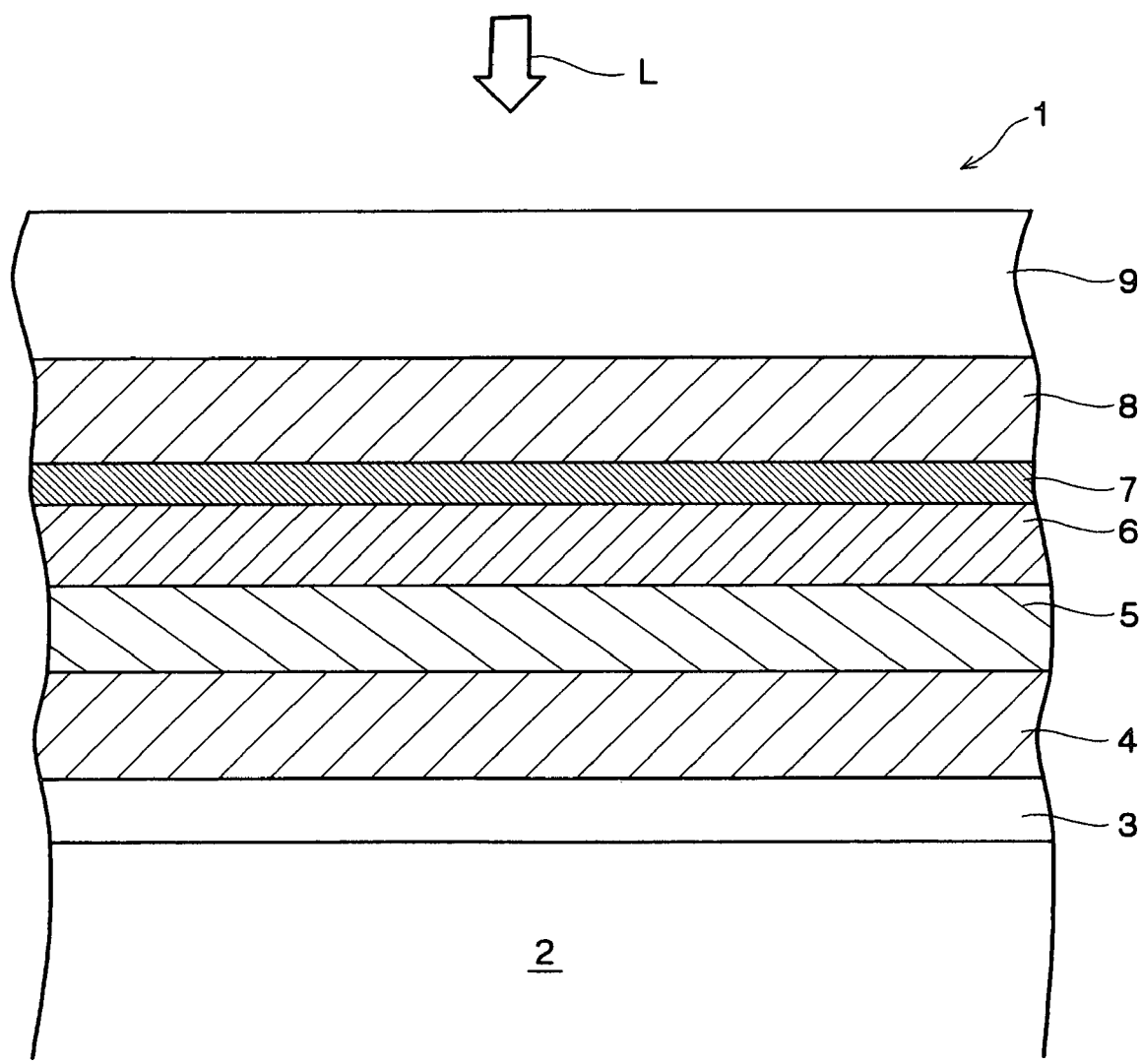
FIG. 2 is an enlarged schematic cross-sectional view of the part of the optical recording disc in FIG. 1 indicated by A within a cross section taken along the track of the optical recording disc.

FIG. 1 is a schematic perspective view showing an optical recording disc that is a preferred embodiment of the present invention and FIG. 2 is an enlarged schematic cross-sectional view of the part of the optical recording disc in FIG. 1 indicated by A within a cross section taken along the track of the optical recording disc.

As shown in FIG. 2, an optical recording disc 1 includes a support substrate 2, and a reflective layer 3, a third dielectric layer 4, a light absorption layer 5, a second dielectric layer 6, a decomposition reaction layer 7, a first dielectric layer 8 and a light transmission layer 9 are laminated on the support substrate 2 in this order.

In this embodiment, the optical recording disc 1 is constituted so that data are recorded and data recorded therein are reproduced by irradiating a beam L thereonto from the side of the light transmission layer 9. The laser beam L has a wavelength of 390 nm to 420 nm and is converged onto the optical recording disc 1 using an objective lens having a numerical aperture of 0.7 to 0.9.

The support substrate 2 serves as a support of the optical recording disc 1 for ensuring mechanical strength required for the optical recording disc 1.

The material used to form the support substrate 2 is not particularly limited insofar as the support substrate 2 can serve as the support of the optical recording disc 1. The support substrate 2 can be formed of glass, ceramic, resin or the like. Among these, resin is preferably used for forming the support substrate 11 since resin can be easily shaped. Illustrative examples of resins suitable for forming the support substrate 11 include polycarbonate resin, olefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and olefin resin are most preferably used for forming the support substrate 2 from the viewpoint of easy processing, optical characteristics and the like.

In this embodiment, the support substrate 2 is formed of polycarbonate resin and has a thickness of 1.1 mm.

As shown in FIG. 2, the reflective layer 6 is formed on the surface of the support substrate 2 of the optical recording disc 1.

The reflective layer 3 serves to reflect the laser beam L entering through the light transmission layer 9 so as to emit it from the light transmission layer 9.

The material usable for forming the reflective layer 3 is not particularly limited and the reflective layer 3 can be formed of at least one kind of element selected from a group consisting of Au, Ag, Cu, Pt, Al, Ti, Cr, Fe, Co, Ni, Mg, Zn, Ge, Si, Pd and Nd.

The thickness of the reflective layer 3 is not particularly limited but it is preferable to form the reflective layer 3 so as to have a thickness of 5 nm to 200 nm.

As shown in FIG. 2, the third dielectric layer 4 is formed on the surface of the reflective layer 3 of the optical recording disc 1.

In this embodiment, the third dielectric layer 4 serves to protect the support substrate 2 and the reflective layer 3 and also physically and chemically protect the light absorption layer 5 formed thereon.

The dielectric material usable for forming the third dielectric layer 4 is not particularly limited and the third dielectric layer 4 is formed of a dielectric material containing oxide, sulfide, nitride or the combination thereof as a primary component. It is preferable to form the third dielectric layer 4 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof.

The third dielectric layer 4 can be formed on the reflective layer 3 by a gas phase growth process using chemical species containing elements for forming the third dielectric layer 4. Illustrative examples of the gas phase growth processes include vacuum deposition process, sputtering process and the like.

The thickness of the third dielectric layer 4 is not particularly limited but it is preferable to form the third dielectric layer 4 so as to have a thickness of 10 nm to 140 nm.

As shown in FIG. 2, the light absorption layer 5 is formed on the surface of the third dielectric layer 4 of the optical recording disc 1.

In this embodiment, the light absorption layer 5 serves to absorb a laser beam L whose power is set to the recording power and which is irradiated onto the optical recording disc 1, generate heat and transfer the thus generated heat to the decomposition reaction layer 7.

In this embodiment, the light absorption layer 5 is formed of an alloy containing one of Sb and Te having a high light absorption coefficient and low thermal conductivity.

As an alloy contained in the light absorption layer 5 and containing one of Sb and Te, an alloy represented by the general formula: $(Sb_aTe_{1-a})_{1-b}M_b$ or $\{(GeTe)_c(Sb_2Te_3)_{1-d}\}_d X_{1-d}$ is particularly preferable. Here, the element M represents an element other than Sb and Te and the element X represents an element other than Sb, Te and Ge.

In the case where the alloy which contains at least one of Sb and Te and is contained in the light absorption layer 5 is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer 5 becomes lower than the required value and the thermal conductivity thereof becomes lower than the required value required.

The element M is not particularly limited but it is preferable for the element M to be at least one element selected from the group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy contained in the light absorption layer 5 and containing at least one of Sb and Te is represented by the general formula: $\{(GeTe)_c (Sb_2Te_3)_{1-d}\}_d X_{1-d}$, it is preferable for c and d to be such that c is equal to or larger than 1/3 and equal to or smaller than 2/3 and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

In the case where a laser beam having a wavelength $\lambda$ of 380 nm to 450 nm is employed, it is particularly preferable for the element M to be at least one element selected from a group consisting of Ag, In, Ge and rare earth elements and it is particularly preferable for the element X to be at least one element selected from a group consisting of Ag, In and rare earth elements.

The light absorption layer 5 can be formed on the surface of the third dielectric layer 4 by a gas phase growth process using chemical species containing elements for forming the light absorption layer 5. Illustrative examples of the gas phase growth processes include vacuum deposition process, sputtering process and the like.

It is preferable for the light absorption layer 5 to have a thickness of 5 nm to 100 nm. In the case where the thickness of the light absorption layer 5 is smaller than 5 nm, the amount of light absorbed therein becomes too small and on the other hand, in the case where the thickness of the light absorption layer 5 is larger than 100 nm, the light absorption layer 5 does not readily deform when a void is formed in the decomposition reaction layer 7 as described later.

As shown in FIG. 2, the second dielectric layer 6 is formed on the surface of the light absorption layer 5 of the optical recording disc 1.

In this embodiment, the second dielectric layer 6 serves to physically and chemically protect the decomposition reaction layer 7 in cooperation with the first dielectric layer 8.

The material usable for forming the second dielectric layer 6 is not particularly limited and the second dielectric layer 6 can be formed of the same material used for forming the third dielectric layer 4. The second dielectric layer 6 can be formed by a gas phase growth process similarly to the third dielectric layer 4.

It is preferable to form the second dielectric layer 6 so as to have a thickness of 5 nm to 100 nm.

As shown in FIG. 2, the decomposition reaction layer 7 is formed on the surface of the second dielectric layer 6 of the optical recording disc 1.

In this embodiment, the decomposition reaction layer 7 serves as a recording layer and a recording mark is formed in the decomposition reaction layer 7 when data are to be recorded in the optical recording disc 1.

In this embodiment, the decomposition reaction layer 7 contains platinum oxide ($PtO_x$) as a primary component.

In this embodiment, it is particularly preferable for x to be equal to or larger than 1.0 and smaller than 3.0 in order to obtain a reproduced signal having a high C/N ratio even in the case where the length of a recording mark or the length of a blank region between neighboring recording marks is shorter than the resolution limit.

The decomposition reaction layer 7 can be formed on the surface of the second dielectric layer 6 by a gas phase growth process using chemical species containing elements for forming the decomposition reaction layer 7. Illustrative examples of the gas phase growth processes include vacuum deposition process, sputtering process and the like.

It is preferable to form the decomposition reaction layer 7 so as to have a thickness of 2 nm to 50 nm.

As shown in FIG. 2, the first dielectric layer 8 is formed on the surface of the decomposition reaction layer.

In this embodiment, the first dielectric layer 8 serves to physically and chemically protect the decomposition reaction layer 7 of the optical recording disc 1.

The material usable for forming the first dielectric layer 8 is not particularly limited and the first dielectric layer 8 can be formed of the same material used for forming the third dielectric layer 4. The first dielectric layer 8 can be formed by a gas phase growth process similarly to the third dielectric layer 4.

As shown in FIG. 2, the light transmission layer 9 is formed on the surface of the first dielectric layer 8 of the optical recording disc 1.

The light transmission layer 9 is a layer through which the laser beam L is transmitted and the surface thereof forms a light incidence plane of the laser beam L.

It is preferable for the light transmission layer 9 to have a thickness of 10 μm to 200 μm and more preferable for the light transmission layer 9 to have a thickness of 50 μm to 150 μm.

The material for forming the light transmission layer 9 is not particularly limited insofar as it is optically transparent and have a low absorption ratio and a reflectivity with respect to a laser beam having a wavelength of 390 nm to 420 nm of the wavelength of the laser beam L, and a low birefringence factor. In the case where the light transmission layer 9 is formed using a spin coating method or the like, ultraviolet ray curable resin, electron beam curable resin, thermosetting resin or the like can be used for forming the light transmission layer 9 and activated energy ray curable type resin such as ultraviolet ray curable resin and electron beam curable resin is most preferably used for forming the light transmission layer 8.

The light transmission layer 9 may be formed by adhering a sheet formed of light transmittable resin onto the surface of the first dielectric layer 8 using an adhesive agent.

When the light transmission layer 9 is formed using a spin coating method, the thickness thereof is preferably 10 μm to 200 μm and when the light transmission layer 9 is formed by adhering a sheet formed of light transmittable resin onto the surface of the first dielectric layer 8 using an adhesive agent, the thickness thereof is preferably 50 μm to 150 μm.

Figure 3:
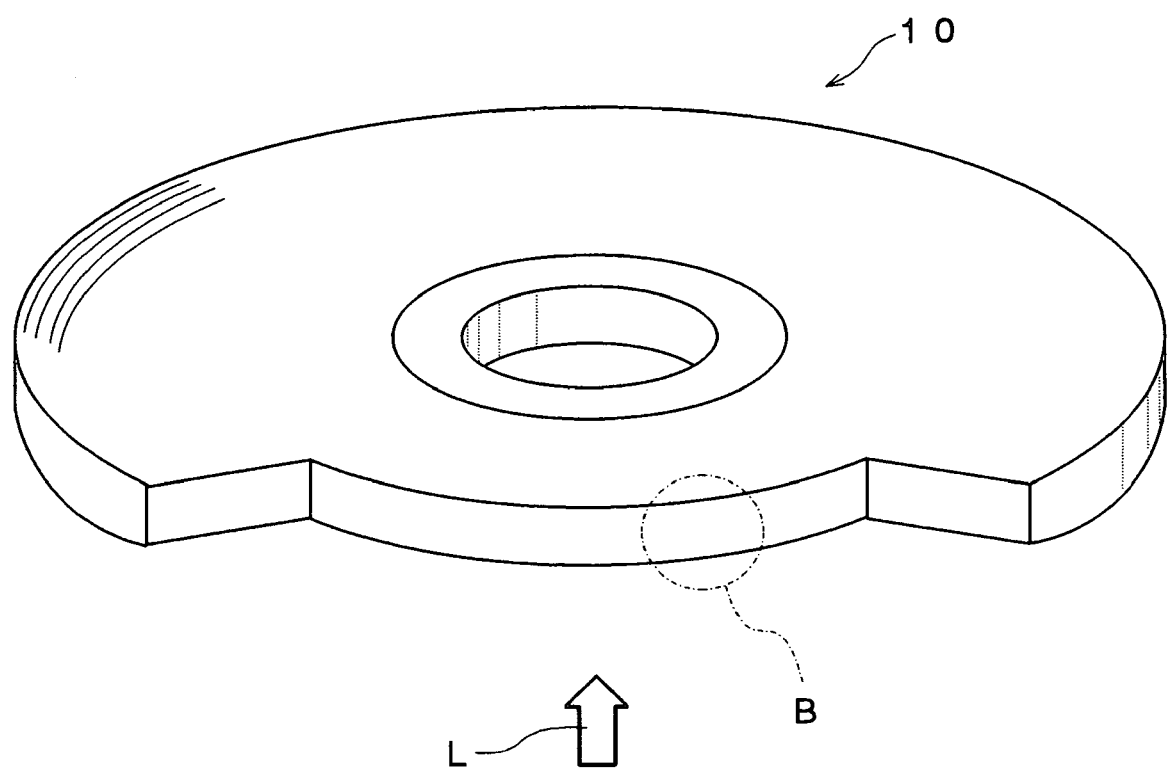
FIG. 3 is a schematic perspective view showing an optical recording disc that is another preferred embodiment of the present invention.
Figure 4:
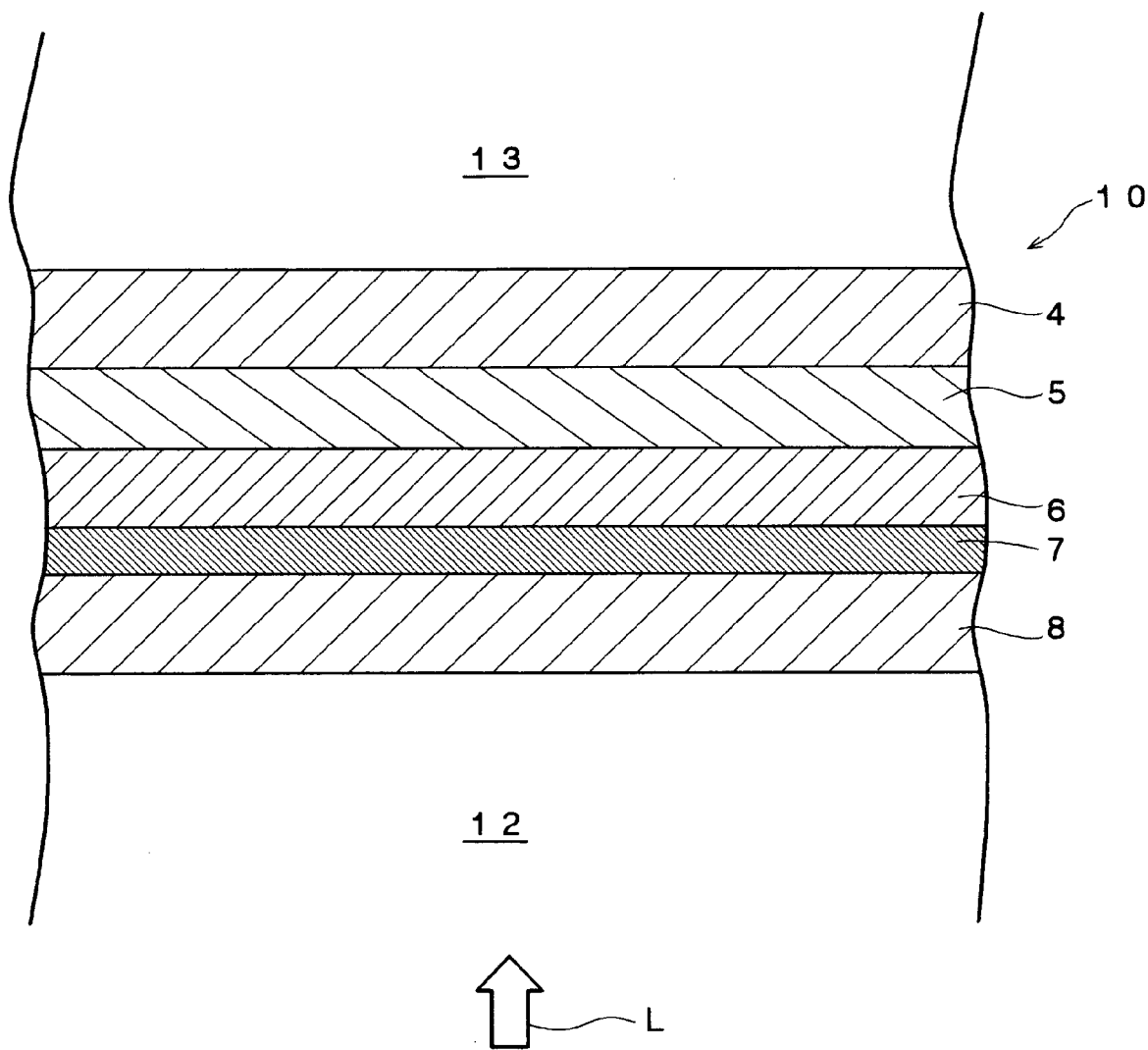
FIG. 4 is an enlarged schematic cross-sectional view of the part of the optical recording disc indicated by B in FIG. 3 among cross sections of the optical recording disc along a track.

FIG. 3 is a schematic perspective view showing an optical recording disc that is another preferred embodiment of the present invention and FIG. 4 is an enlarged schematic cross-sectional view of the part of the optical recording disc in FIG. 3 indicated by B within a cross section taken along the track of the optical recording disc.

As shown in FIG. 4, an optical recording disc 10 according to this embodiment includes a light transmissible substrate 12, and a first dielectric layer 8, a decomposition reaction layer 7, a second dielectric layer 6, a light absorption layer 5, a third dielectric layer 4 and a substrate 13 for adjusting the thickness of the optical recording disc 10 are laminated on the light transmissible substrate 12 in this order.

As shown in FIG. 4, the optical recording disc 10 is constituted so that data are recorded and data recorded therein are reproduced by irradiating a laser beam L thereonto from the side of the light transmissible substrate 12. The laser beam L has a wavelength of 630 nm to 675 nm and is converged onto the optical recording disc 1 using an objective lens having a numerical aperture of 0.59 to 0.66.

The light transmissible substrate 12 is a layer through which the laser beam L is transmitted when data are to be recorded in the decomposition reaction layer 7 and data recorded in the decomposition reaction layer 7 are to be reproduced and serves as a support of the optical recording disc 10 for ensuring mechanical strength required for the optical recording disc 10. The light transmissible substrate 12 is formed to be disc-like and so as to have a thickness of about 0.6 mm.

The material for forming the light transmissible substrate 12 is not particularly limited insofar as it is transmissible with respect to the laser beam L having a wavelength $\lambda$ of 630 nm to 675 nm. The light transmissible substrate 12 can be formed of glass, ceramic, resin or the like, for example and it is particularly preferable to form the light transmissible substrate 12 of polycarbonate resin from the viewpoint of easy processing, optical characteristics and the like.

The substrate 13 for adjusting the thickness of the optical recording disc 10 is a disc-like substrate used for adjusting the thickness of the optical recording disc 1 so that the total thickness thereof is about 1.2 mm and is formed so as to have a thickness of about 0.6 mm. The substrate 13 for adjusting the thickness of the optical recording disc 10 also serves to improve the rigidity of the optical recording disc 10.

The material for forming the substrate 13 for adjusting the thickness of the optical recording disc 10 is not particularly limited and the substrate 13 for adjusting the thickness of the optical recording disc 10 can be formed of glass, ceramic, resin or the like similarly to the light transmissible substrate 12.

Data are recorded in and reproduced from the optical recording disc 1 shown in FIGS. 1 and 2 as set out in the following. Data can also be similarly recorded in and reproduced from the optical recording disc 10 shown in FIGS. 3 and 4.

Figure 5:
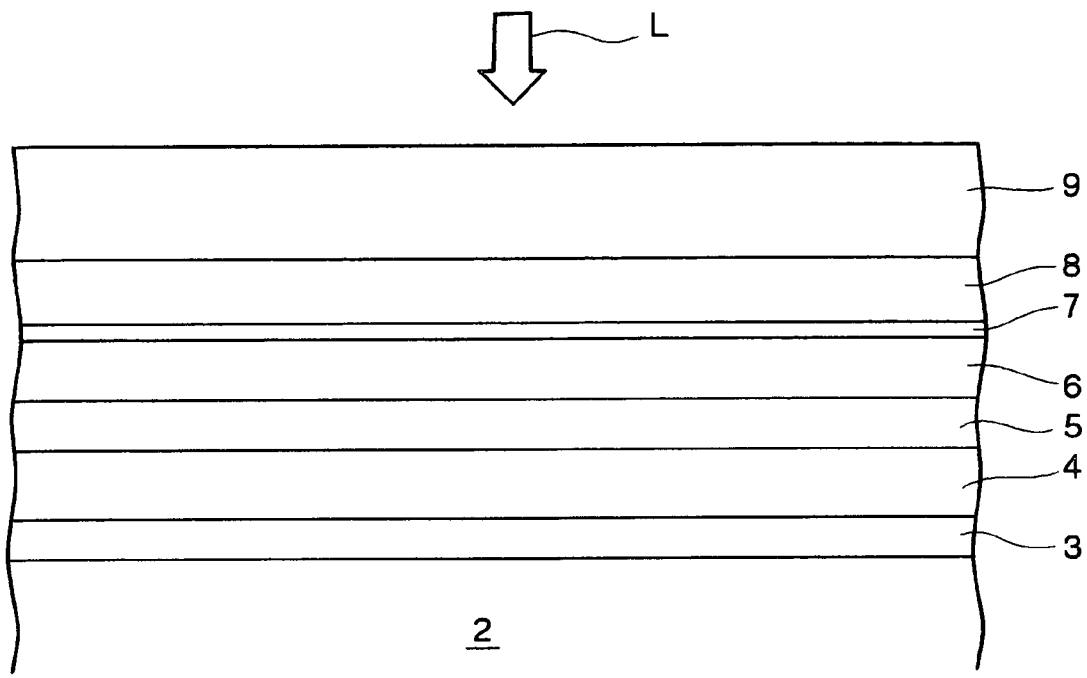
FIG. 5 is a partly enlarged schematic cross-sectional view of an optical recording disc before data are recorded therein.
Figure 6:
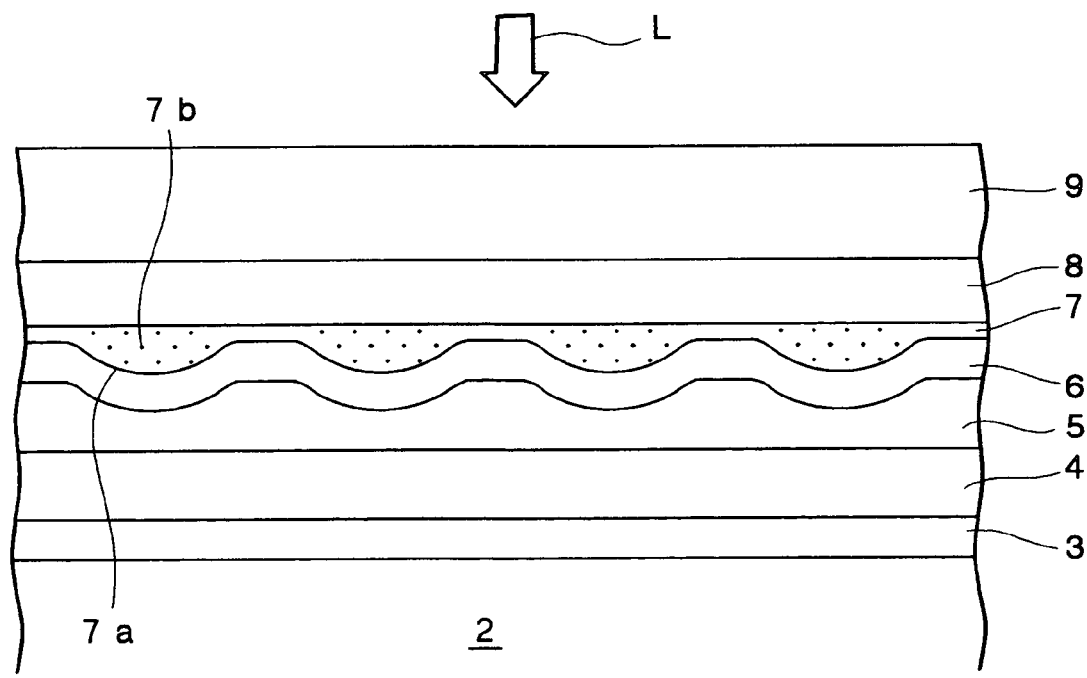
FIG. 6 is a partly enlarged schematic cross-sectional view of an optical recording disc after data were recorded therein.

FIG. 5 is a partly enlarged schematic cross-sectional view of an optical recording disc before data were recorded therein and FIG. 6 is a partly enlarged schematic cross-sectional view of an optical recording disc after data were recorded therein.

When data are to be recorded in the optical recording disc 1, a laser beam L is irradiated onto the optical recording disc 1 from the side of the light transmission layer 9.

When the laser beam L whose power is set to the recording power is irradiated onto the optical recording disc 1, since the light absorption layer 5 is formed of an alloy containing one of Sb and Te having a high light absorption coefficient, a region of the light absorption layer 5 irradiated with the laser beam L is heated.

Heat generated in the light absorption layer 5 is transferred to the decomposition reaction layer 7 and the temperature of the decomposition reaction layer 7 increases.

Thus, when the decomposition reaction layer 7 is heated to a temperature equal to or higher than the decomposition temperature of platinum oxide, the platinum oxide contained in the decomposition reaction layer 7 as a primary component is decomposed into platinum and oxygen.

As a result, as shown in FIG. 6, a void 7a is formed in the decomposition reaction layer 7 by oxygen gas generated by the decomposition of the platinum oxide and fine particles 7b of platinum precipitate into the void 7a.

Simultaneously, as shown in FIG. 6, the second dielectric layer 6 is deformed together with the decomposition reaction layer 7 by the pressure of the oxygen gas.

Since the region where the void 7a is formed and the second dielectric layer 6 and the decomposition reaction layer 7 are deformed in this manner has different optical properties from those of other regions, a recording mark is constituted by the region where the void 7a is formed and the second dielectric layer 6 and the decomposition reaction layer 7 are deformed.

In this embodiment, thus formed recording marks and blank regions between neighboring recording marks include ones having a length shorter than $\lambda/4NA$ and a recording mark train including recording marks and blank regions having lengths shorter than the resolution limit is formed.

Further, in this embodiment, the decomposition reaction layer 7 contains platinum oxide having a high decomposition temperature as a primary component, so that when a laser beam L whose power is set to the recording power Pw is irradiated onto the optical recording disc 1 to form a recording mark, it is possible to prevent the decomposition reaction of platinum oxide from occurring in regions other than the region irradiated with the laser beam L even if heat is dissipated from the region of the decomposition reaction layer 7 irradiated with the laser beam L to regions of the decomposition reaction layer 7 therearound. Therefore, it is possible to form the void $7a$ at a desired region of the decomposition reaction layer 7 to form a recording mark therein.

Furthermore, in this embodiment, when the platinum oxide is decomposed and fine particles $7b$ of platinum precipitate into the void $7a$, thereby forming a recording mark, since the particle size of each of the fine particles $7b$ of platinum is smaller than the size of the void $7a$ formed in the decomposition reaction layer 7, it is possible to effectively prevent the shape of the void $7a$ from being affected by fine particles $7b$ of platinum precipitating into the void $7a$ and prevent a recording mark from being undesirably deformed.

Thus, a recording mark train is formed in the optical recording disc 1, thereby recording data therein.

Data recorded in the optical recording disc 1 are reproduced in the following manner.

When data recorded in the optical recording disc 1 are to be reproduced, a laser beam L is irradiated onto the optical recording disc 1 from the side of the light transmission layer 9.

In a study done by the inventors of the present invention, it was found that in the case where data were recorded in the decomposition reaction layer 7 of the optical recording disc 1 in the above described manner, even when the length of a recording mark or the length of a blank region between neighboring recording marks constituting a recording mark train was shorter than the resolution limit, data could be reproduced by converging the laser beam L onto the optical recording disc 1 from the side of the light transmission layer 9.

Although it is not altogether clear why, in the case where the platinum oxide contained in the decomposition reaction layer 7 as a primary component is decomposed into platinum and oxygen, a void $7a$ is formed in the decomposition reaction layer 7 and fine particles $7b$ of platinum precipitate into the void $7a$ by the thus generated oxygen gas, thereby forming a recording mark in the decomposition reaction layer 7 and recording data in the optical recording disc 1, it is possible to reproduce data recorded in the optical recording disc 1 even in the case where the length of a recording mark or the length of a blank region between neighboring recording marks constituting a recording mark train is shorter than the resolution limit, it is reasonable to conclude that near-field light is generated by irradiating the laser beam L onto the fine particles $7b$ of platinum precipitated into the void $7a$ and the resolution limit disappears or that the resolution limit becomes smaller due to the interaction between the fine particles $7b$ of platinum precipitated into the void $7a$ and the laser beam L irradiated onto the fine particles $7b$ of platinum.

In a further study done by the inventors of the present invention, it was found that in an optical recording disc 1 in which data were recorded by forming a recording mark having a length shorter than the resolution limit and a blank region having a length shorter than the resolution limit in the decomposition reaction layer 7, the thus recorded data could not be reproduced unless the read power Pr of the laser beam was set to be higher than a predetermined power but on the other hand, signal characteristics of a reproduced signal such as a C/N ratio became worse if the read power Pr of the laser beam was set too high.

Therefore, in order reproduce data recorded in the optical recording disc 1 by forming a recording mark having a length shorter than the resolution limit and a blank region having a length shorter than the resolution limit in the decomposition reaction layer 7 in a desired manner, it is necessary to control the level of the read power Pr of the laser beam to a level suitable for reproducing data recorded in the optical recording disc 1 prior to reproducing data.

In a further study done by the inventors of the present invention, it was found that in the case of varying the readout linear velocity at which data are to be reproduced from an optical recording disc when reproducing data recorded in the optical recording disc by forming a recording mark having a length shorter than the resolution limit and a blank region having a length shorter than the resolution limit in a decomposition reaction layer, the signal characteristics of the reproduced signal were not stable and the signal characteristics of the reproduced signal such as the C/N ratio became worse.

Generally, the readout linear velocity is often varied in accordance with the user's request or the like when data recorded in an optical recording disc 1 are to be reproduced and, in particular, in the case of rotating the optical recording disc 1 at a constant angular velocity, the readout linear velocity frequently varies depending upon the position of the laser beam L irradiated onto the optical recording disc 1 even if the user does not intentionally vary the readout linear velocity. In order to reproduce data recorded in an optical recording disc 1 in a desired manner even in such a case, it is necessary to control the read power Pr of the laser beam to a level suitable for the instantaneous readout linear velocity.

Figure 7:
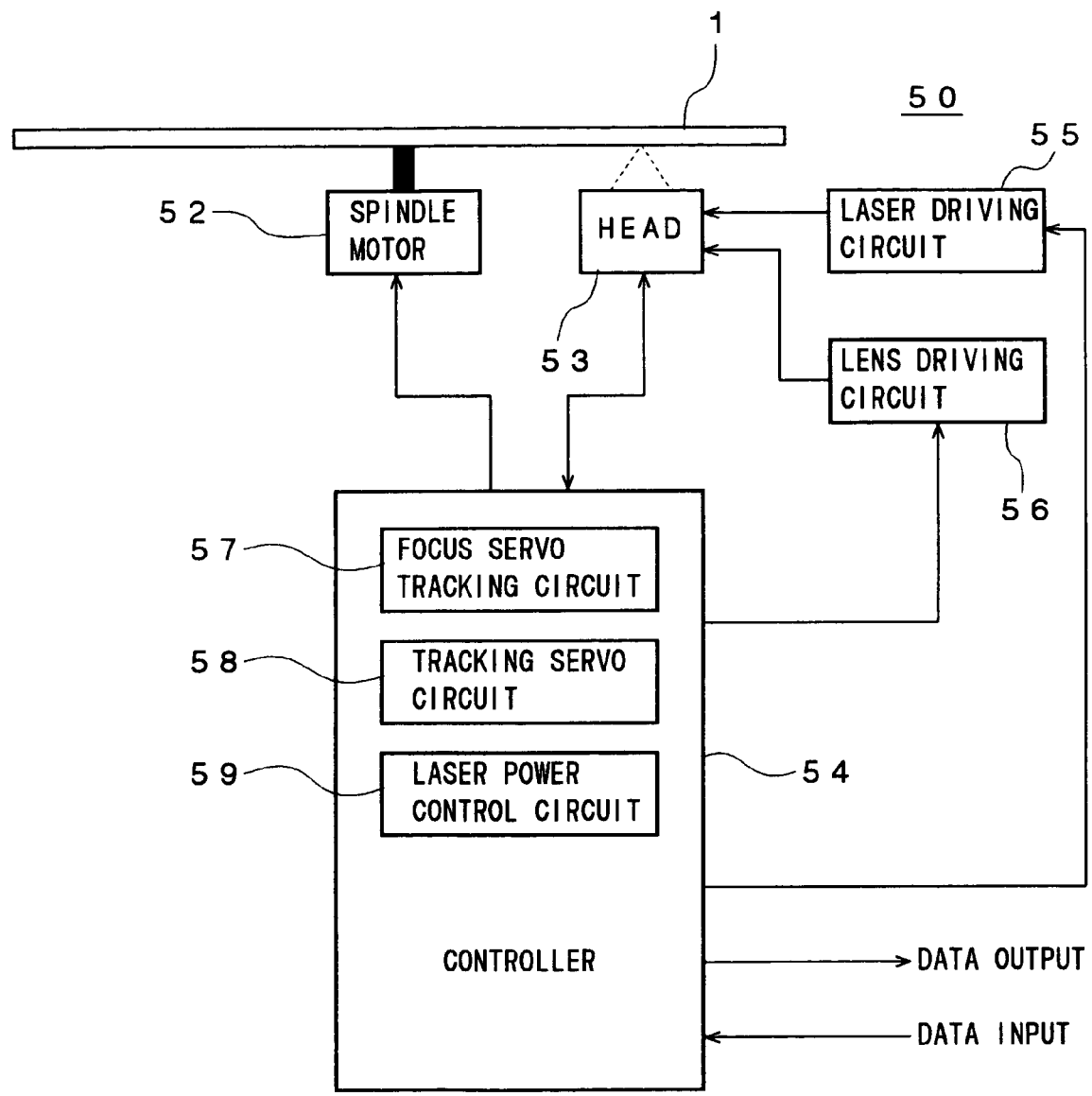
FIG. 7 is a block diagram showing a data recording and reproducing apparatus that is a preferred embodiment of the present invention.

FIG. 7 is a block diagram showing a data recording and reproducing apparatus that is a preferred embodiment of the present invention.

As shown in FIG. 7, a data recording and reproducing apparatus 50 according to this embodiment includes a spindle motor 52 for rotating the optical recording disc 1, a head 53 for emitting a laser beam L toward the optical recording disc 1 and receiving the laser beam L reflected by the optical recording disc 1, a controller 54 for controlling the spindle motor 52 and the head 53, a laser driving circuit 55 for feeding a laser driving signal to the head 53, and a lens driving circuit 56 for feeding a lens driving signal to the head 53.

As shown in FIG. 7, the controller 54 includes a focus servo tracking circuit 57, a tracking servo circuit 58 and a laser power control circuit 59.

When the tracking servo circuit 58 is activated, the spot of the laser beam L automatically follows the track of the optical recording disc 1.

Each of the focus servo tracking circuit 57 and the tracking servo circuit 58 has an auto-gain control function for automatically adjusting the focus gain and an auto-gain control function for automatically adjusting the tracking gain.

Further, the laser power control circuit 59 is adapted to generate a laser drive signal to be supplied by the laser driving circuit 55.

In this embodiment, prior to shipping the optical recording disc 1, a recommended recording power $Pw1'$ of the recording power Pw of the laser beam L and a recommended read power $Pr1'$ of the read power Pr of the laser beam L at the lowest linear velocity V1 among the linear velocities actually usable for recording and reproducing data and a recommended recording power $Pw2'$ of the recording power Pw of the laser beam L and a recommended read power $Pr2'$ of the read power Pr of the laser beam L at the highest linear velocity V2 among the linear velocities actually usable for recording and reproducing data are determined by the optical recording disc manufacturer and recorded together with the linear velocities V1 and V2 as data for setting recording and reproducing conditions in the optical recording disc 1 in a form of wobbles or pre-pits.

Here, the recommended recording power Pw1' and the recommended read power Pr1' are determined based on recording characteristics and reproducing characteristics obtained by recording data in a plurality of optical recording disc samples having the same configuration at the linear velocity V1 while the recording power Pw of the laser beam L is varied and reproducing data recorded in the optical recording disc samples at the linear velocity V1 while the read power Pr of the laser beam L is varied. Similarly, the recommended recording power Pw2' and the recommended read power Pr2' are determined based on recording characteristics and reproducing characteristics obtained by recording data in a plurality of optical recording disc samples having the same configuration at the linear velocity V2 while the recording power Pw of the laser beam L is varied and reproducing data recorded in the optical recording disc samples at the linear velocity V2 while the read power Pr of the laser beam L is varied.

Further, in the data recording and reproducing apparatus 50 according to this embodiment, program data for determining the optimum recording power Pw and optimum read power Pr of the laser beam L described later are stored in a nonvolatile memory such as a flash memory or the like. Therefore, prior to recording data in the optical recording disc 1 or reading data recorded in the optical recording disc 1, the controller 54 uses the recommended recording power Pw1' the recommended read power Pr1', the recommended recording power Pw2', the recommended read power Pr2' and the linear velocities V1 and V2 read from the optical recording disc 1 to determine the optimum recording power Pw of the laser beam L used for recording data in the optical recording disc 1 and the optimum read power Pr of the laser beam L used for reproducing data recorded in the optical recording disc 1.

Figure 8:
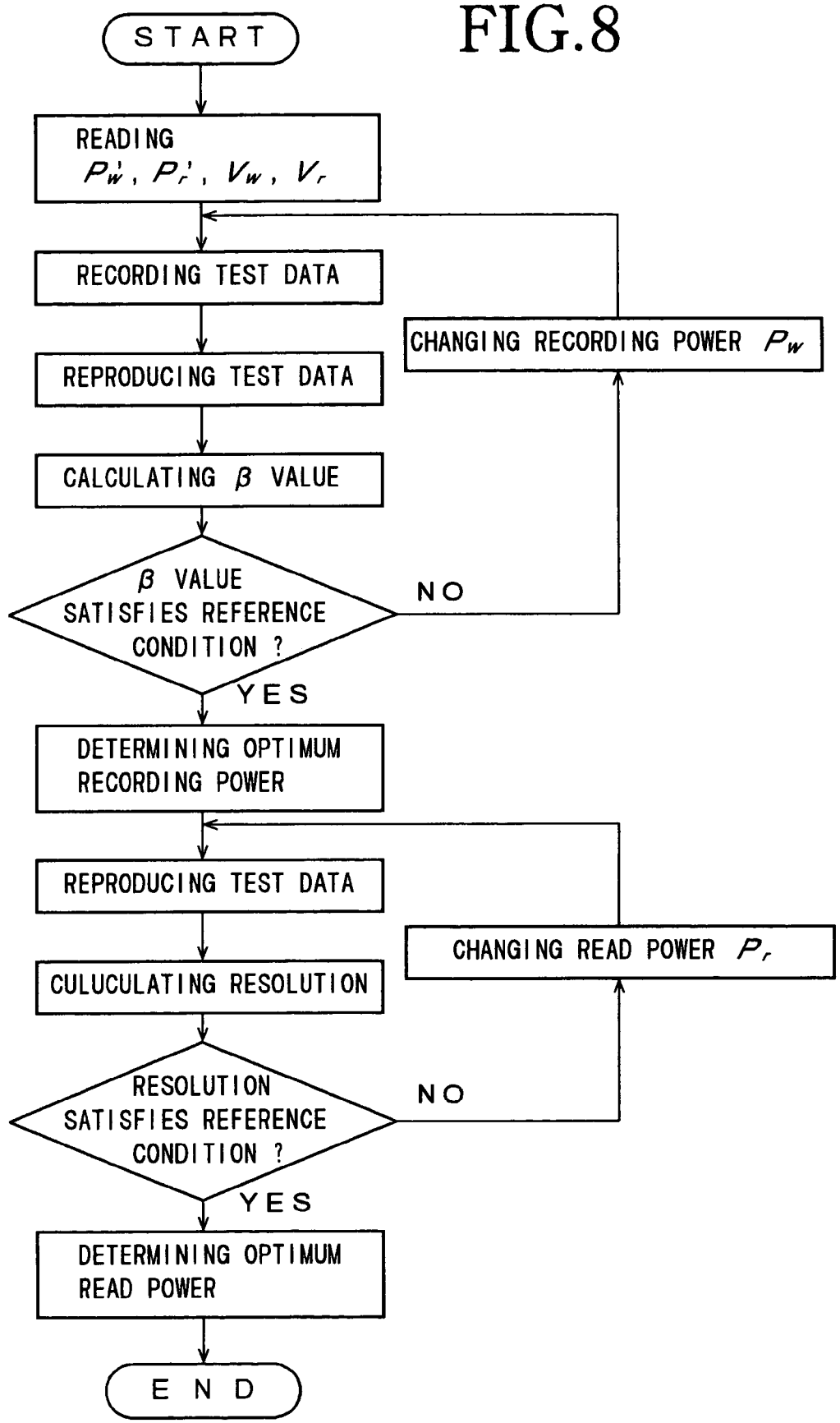
FIG. 8 is a flow chart showing a main routine for determining the optimum recording power and the optimum read power of a laser beam L.

FIG. 8 is a flow chart showing a main routine for determining the recording power Pw and the read power Pr of the laser beam L.

Here, an explanation will be made as to a case where the optical recording disc 1 is rotated at a constant angular velocity, data are recorded in the optical recording disc 1 under the CAV control and the thus recorded data are reproduced. Therefore, the linear velocity V1 corresponds to the linear velocity when the laser beam L is being irradiated onto the innermost track among tracks formed on the optical recording disc 1 and the linear velocity V2 corresponds to the linear velocity when the laser beam L is being irradiated onto the outermost track of the optical recording disc 1.

As shown in FIG. 8, when the optimum recording power Pw and the optimum read power Pr of the laser beam L are to be determined, the controller 54 of the data recording and reproducing apparatus 50 first reads the recommended recording power Pw1', the recommended read power Pr1', the recommended recording power Pw2', the recommended read power Pr2', and the linear velocities V1 and V2 from the optical recording disc 1.

When the recommended recording power Pw1', the recommended read power Pr1' the recommended recording power Pw2', the recommended read power Pr2', and the linear velocities V1 and V2 have been read, the controller 54 determines the optimum read power Pr1 of the laser beam L at the linear velocity V1.

Figure 9:
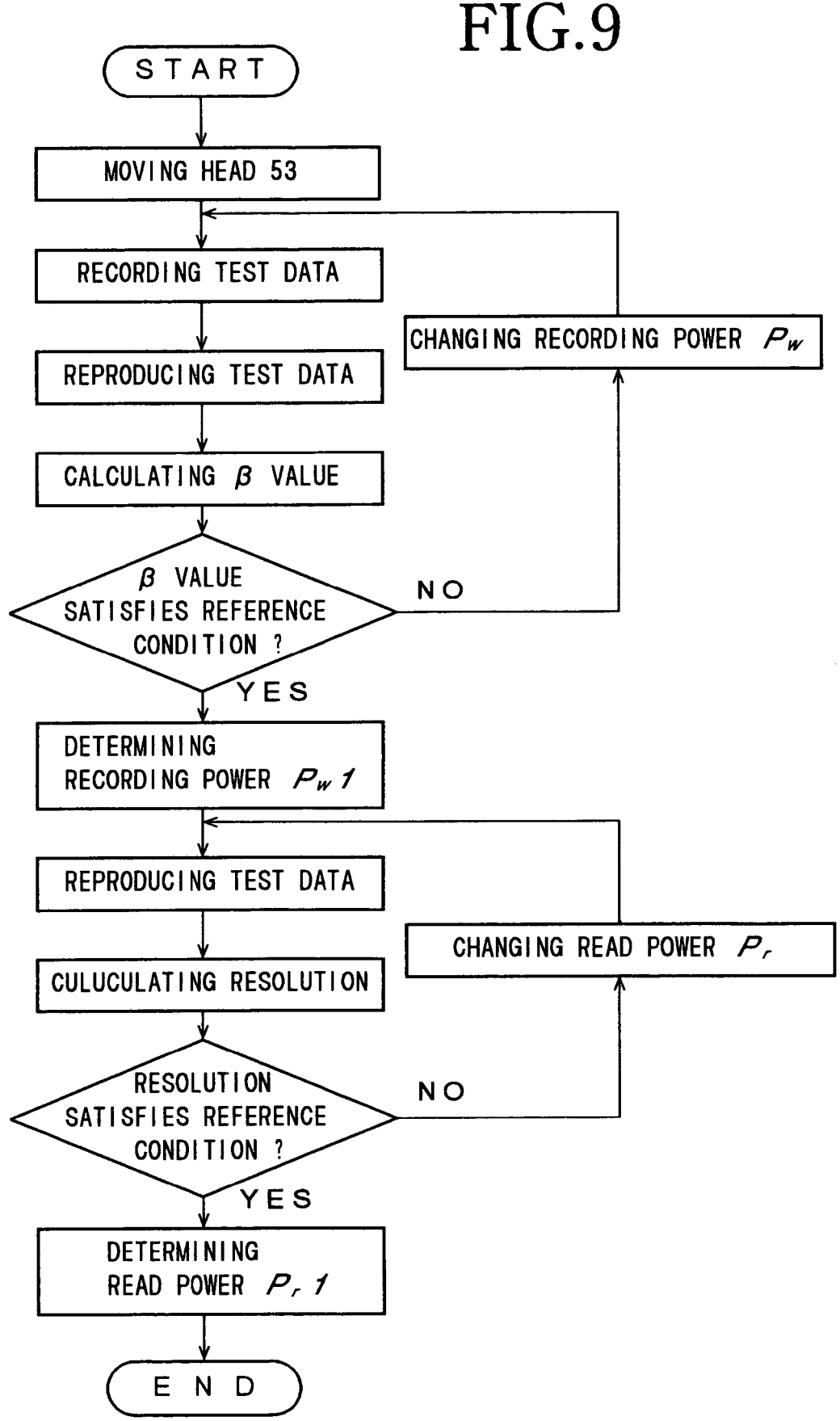
FIG. 9 is a flow chart showing a sub-routine for determining the optimum read power of a laser beam L at a linear velocity V1.

FIG. 9 is a flow chart showing a sub-routine for determining the optimum read power Pr1 of the laser beam L at the linear velocity V1.

As shown in FIG. 9, when the optimum read power Pr1 of the laser beam L at the linear velocity V1 is to be determined, the controller 54 first moves the head 53 so that the linear velocity becomes equal to the linear velocity V1; in other words, the laser beam L is irradiated onto innermost track of the optical recording disc 1 and performs tracking control and focus control.

When tracking control and focus control have been completed, the controller 54 sets the recording power Pw of the laser beam L to the recommended recording power Pw',.

When the recording power Pw of the laser beam L has been set to the recommended recording power Pw', the laser power control circuit 59 generates a laser power control signal so that the power of the laser beam L generated by the head 53 becomes equal to the recommended recording power Pw' and outputs it to the laser driving circuit 55, thereby causing the laser driving circuit 55 to generate a laser driving signal and output it to the head 53.

When the recording power Pw of the laser beam L has been set to the recommended recording power Pw', the controller 54 irradiats the laser beam L onto the optical recording disc 1 and records test data on the innermost track among tracks formed on the optical recording disc 1.

The test data are recorded by forming a recording mark train including at least one of a recording mark having a length shorter than a resolution limit and a blank region having a length shorter than the resolution limit in the decomposition reaction layer 7 on the innermost track among tracks formed on the optical recording disc 1.

When the test data have been recorded, the controller 54 sets the read power of the laser beam L to the recommended read power Pr1' and irradiats the laser beam L whose power is set to the recommended read power Pr' on the optical recording disc 1, thereby reproducing the test data recorded on the innermost track among tracks formed on the optical recording disc 1.

When the test data have been reproduced, the controller 54 calculates the β value from the reproduced signal obtained by reproducing the test data. Here, the β value indicates asymmetric diversity of voltage levels or energy levels obtained by converting light reflected from a recording mark and a blank region formed in the optical recording disc 1 to voltages or energy and has correlation with the length and width of the recording mark. Therefore, the β value is determined depending upon the level of the recording power Pw of the laser beam L used for recording data in the optical recording disc 1.

In the case where the optical recording disc 1 is a High to Low type optical recording disc 1, the β value is defined as $(A1+A2)/(A1-A2)$ where A1 is a local maximal value on the plus side of an alternating signal obtained by reproducing the test signal and A2 is a local minimal value on the minus side of the alternating signal.

Then, the controller judges whether or not the thus calculated β value satisfies reference conditions.

Whether the β value satisfies reference conditions is determined by judging whether or not the thus calculated β value falls within a reference range determined by the standard of the optical recording disc 1.

As a result, when the controller 54 judges that the β value does not satisfy the reference conditions, the controller 54 judges that the level of the recording power Pw of the laser beam L set for recording the test data is inappropriate and outputs a control signal to the laser power control circuit 59 to increase the recording power Pw of the laser beam L.

Then, the laser beam L whose recording power Pw has been changed is irradiated onto the track where the test data have been recorded the optical recording disc 1, whereby test data are again recorded therein and the thus recorded test data are reproduced. It is then judged whether or not the β value calculated from the reproduced signal satisfies reference conditions. At this time, when the β value does not fall within the reference range and is located on the minus side with respect to the reference range, the controller 54 judges that the recording power Pw of the laser beam L is higher than the optimum recording power and it was inappropriate to increase the recording power Pw of the laser beam L and lowers the recording power Pw of the laser beam L. To the contrary, when the β value does not fall within the reference range and is located on the plus side with respect to the reference range, the controller 54 judges that the recording power Pw of the laser beam L once changed is still lower than the optimum recording power and further increases the recording power Pw of the laser beam L.

On the other hand, when the β value satisfies reference conditions, the controller 54 judges that the recording power Pw of the laser beam L set for recording the test data is appropriate and determines the recording power Pw of the laser beam L used for recording the test data as the optimum recording power Pw1 at the linear velocity V1.

When the optimum recording power Pw1 has been determined, the controller 54 sets the power of the laser beam L to the recommended read power Pr1' and reproduces data recorded by irradiating the laser beam L whose power is set to the optimum recording power Pw1 onto the optical recording disc 1.

When the reproduction of the test data has been completed, the controller 54 calculates resolution from a reproduced signal obtained by reproducing the test signal. In this embodiment, the resolution is defined as the ratio Imin/Imax where Imin=(A1min−A2min) is an amplitude of a reproduced signal corresponding to the smallest recording mark among the recording marks formed in the decomposition reaction layer 7 and Imax is an amplitude of a reproduced signal corresponding to the largest recording mark.

Then, the controller 54 judges whether or not the thus calculated resolution satisfies reference conditions. Whether or not the thus calculated resolution satisfies reference conditions is determined by judging whether or not the resolution is larger than a reference value determined by the standard of the optical recording disc 1 or whether or not the thus calculated resolution falls within a reference range determined by the standard of the optical recording disc 1. Here, the amplitude Imin of a direct current corresponding to the smallest recording mark among direct currents obtained by reproducing the test signal is determined depending upon the level of the read power Pr of the laser beam L used for reproducing data recorded in the optical recording disc 1 and, therefore, the resolution of a reproduced signal is determined depending upon the level of the read power Pr of the laser beam L. In view of these facts, in this embodiment, whether or not the read power Pr of the laser beam L is optimum is judged by referring to the resolution of a reproduced signal.

When the controller 54 judges that the resolution does not satisfy the reference conditions, the controller 54 judges that the level of the read power Pr of the laser beam L set for reproducing the test signal was inappropriate and outputs a control signal to the laser power control circuit 59 to increase the level of the read power Pr of the laser beam L.

The laser beam L whose read power Pr has been changed is again irradiated onto the power calibration area of the optical recording disc 1 in which the test data are recorded, thereby reproducing the test signal and it is judged whether or not the resolution calculated from the reproduced signal satisfies the reference conditions. At this time, in the case where the resolution of the test signal obtained by reproducing the test data using the laser beam L whose read power Pr is increased becomes lower than the resolution of the reproduced signal obtained by reproducing the test data before the read power Pr of the laser beam L was increased, the controller 54 judges that it was inappropriate to increase the read power Pr of the laser beam L and lowers the read power Pr of the laser beam L.

On the other hand, when the controller 54 judges that the resolution satisfies the reference conditions, the controller 54 judges that the read power Pr of the laser beam L set for reproducing the test data is appropriate and determines the read power Pr of the laser beam L as the optimum read power Pr1 of the laser beam L at the linear velocity V1.

In this manner, according to this embodiment, the data recording and reproducing apparatus 50 is constituted to form a recording mark train including at least one of a recording mark having a length shorter than a resolution limit and a blank region having a length shorter than the resolution limit in the optical recording disc 1, thereby recording test data therein, reproduce the test data recorded in the optical recording disc 1, judge whether or not the resolution of the reproduced signal satisfies the reference conditions and determine the optimum read power Pr of the laser beam L based on the result of the judgment, and, therefore, it is possible to control the read power Pr of the laser beam L in a desired manner to a level suitable for reproducing data recorded in the optical recording disc 1 prior to actually reproducing data recorded in the optical recording disc 1. Therefore, it is possible to reproduce data recorded in the optical recording disc 1 by forming a recording mark having a length shorter than the resolution limit and a blank region having a length shorter than the resolution limit in the optical recording disc 1 in a desired manner.

In FIG. 8, when the optimum read power Pr1 of the laser beam L at the linear velocity V1 has been determined, the controller 54 determines the optimum read power Pr2 of the laser beam L at the linear velocity V2.

When the optimum read power Pr2 of the laser beam L is to be determined, similarly to the sub-routine shown in FIG. 9, the controller 54 first moves the head 53 so that the linear velocity becomes equal to the linear velocity V2; in other words, the laser beam L is irradiated onto outermost track of the optical recording disc 1. Then, the controller 54 sets the recording power Pw of the laser beam L to the recommended recording power Pw2' and records test data in the optical recording disc 1.

The test data are recorded by forming a recording mark train including at least one of a recording mark having a length shorter than the resolution limit and a blank region having a length shorter than the resolution limit in the decomposition reaction layer 7 on the outermost track among tracks formed on the optical recording disc 1.

When the test data have been recorded, the controller 54 sets the read power of the laser beam L to the recommended read power Pr2', reproduces the test data and calculates the β value from the reproduced signal.

Then, the controller 54 judges whether or not the thus calculated β value satisfies reference conditions.

When the controller judges that the β value does not satisfy the reference conditions, the controller 54 changes the recording power Pw of the laser beam L and on the other hand, when the controller 54 judges that the β value satisfies the reference conditions, the controller 54 determines the recording power Pw of the laser beam L used for recording the test data as the optimum recording power Pw2 at the linear velocity V2.

When the optimum recording power Pw2 at the linear velocity V2 has been determined, the controller 54 sets the power of the laser beam L to the recommended read power Pr1' and reproduces data recorded by irradiating the laser beam L whose power was set to the recording power Pw2 onto the optical recording disc 1.

When the reproduction of the test data has been completed, the controller 54 calculates the resolution from the reproduced signal obtained by reproducing the test signal and judges whether or not the thus calculated resolution satisfies reference conditions.

When the controller 54 judges that the resolution does not satisfy the reference conditions, the controller 54 changes the read power Pr of the laser beam L and on the other hand, when the controller 54 judges that the resolution satisfies the reference conditions, the controller 54 determines the read power Pr of the laser beam L used for reproducing the test data as the optimum read power Pr2 at the linear velocity V2.

When the optimum read power Pr1 at the linear velocity V1 and the optimum read power Pr2 at the linear velocity V2 have been determined in this manner, the controller 54 produces a conversion table of the read power Pr of the laser beam L with respect to the linear velocity based on the optimum read power Pr1 and the read power Pr2.

In a study done by the inventors of the present invention, it was found that in the case of reproducing data recorded in the optical recording disc 1 in such a manner that the platinum oxide contained in the decomposition reaction layer 7 as a primary component was decomposed into platinum and oxygen, a void 7a was formed in the decomposition reaction layer 7 and fine particles 7b of platinum precipitated into the void 7a by the thus generated oxygen gas, thereby forming a recording mark having a length shorter than the resolution limit and a blank region having a length shorter than the resolution limit in the decomposition reaction layer 7, the optimum read power Pr of the laser beam L became higher as the readout linear velocity at which data recorded in the optical recording disc 1 were to be reproduced was higher and there was a linear relationship between the readout linear velocity at which data were to be reproduced and the optimum read power Pr of the laser beam L at the readout linear velocity.

Therefore, in this embodiment, the controller 54 linearly interpolates between two points corresponding to the thus determined optimum read power Pr1 and read power Pr2 to produce a transition line of the optimum read power Pr of the laser beam L and produces the conversion table based thereon.

In this manner, in this embodiment, the conversion table is produced to change the read power Pr of the laser beam L so that the read power Pr of the laser beam L becomes higher as the readout linear velocity at which data recorded in the optical recording disc 1 are to be reproduced increases.

In this embodiment, since the optical recording disc 1 is rotated at a constant angular velocity, data are recorded in the optical recording disc 1 under the CAV control and the thus recorded data are reproduced, address read from the optical recording disc 1 and the readout linear velocity at which data are to be reproduced have correlation with each other, and therefore, the conversion table is produced so that an address recorded in the optical recording disc 1 and an optimum read power Pr are correlated with each other.

The data recording and reproducing apparatus 50 stores the thus produced conversion table in a memory (not shown) such as a RAM and waits for data recording instructions or data reproducing instructions from the user.

When the user instructs the data recording and reproducing apparatus 50 waiting for data recording instructions or data reproducing instructions to reproduce data, command data corresponding to the data reproducing instructions are input together with address data indication address on the optical recording disc 1 to the data recording and reproducing apparatus 50.

When the command data and the address data have been input, the controller 54 refers to the conversion table based on the thus input address data, thereby determining a read power Pr of the laser beam L, and moves the head 53 so that the laser beam L is irradiated onto the track of the specified address.

When the read power Pr of the laser beam L has been determined, the laser power control circuit 59 generates a laser power control signal so that the power of the laser beam L generated by the head 53 becomes equal to the thus determined read power Pr and outputs it to the laser driving circuit 55, thereby causing the laser driving circuit 55 to generate a laser driving signal and output it to the head 53.

In this manner, the read power Pr of the laser beam L is determined and data recorded at a region of the specified address are reproduced.

Thus, the read power Pr of the laser beam L has been determined and data recorded in the optical recording disc 1 have been reproduced.

As described above, according to this embodiment, data recorded in the optical recording disc 1 are reproduced by producing the conversion table in such a manner that the read power Pr of the laser beam L becomes higher as the readout linear velocity at which data are to be reproduced is higher and the read power Pr of the laser beam L is changed in accordance with the thus produced conversion table, so that it is possible to always obtain a reproduced signal having good signal characteristics even in the case of varying the readout linear velocity in accordance with the user's request or in the case where the optical recording disc 1 is rotated under the CAV control and the readout linear velocity frequently varies depending upon the position of the laser beam irradiated onto the optical recording disc 1.

WORKING EXAMPLES

Hereinafter, working examples will be set out in order to further clarify the advantages of the present invention.

Working Example 1

An optical recording disc sample #1 was fabricated in the following manner.

A light transmissible substrate having a thickness of 0.6 mm and a diameter of 120 mm was first set in a sputtering apparatus and a first dielectric layer having a thickness of 130 nm was formed on the surface of the light transmissible substrate by a sputtering process using a target of a mixture of ZnS and $SiO_2$. The mole ratio of ZnS to $SiO_2$ in the mixture of ZnS and $SiO_2$ contained in the first dielectric layer was 85:15.

Then, a decomposition reaction layer containing platinum oxide as a primary component and having a thickness of 4 nm was formed on the surface of the first dielectric layer by by a sputtering process using a mixed gas of Ar gas and oxygen gas as a sputtering gas and a Pt target.

Then, a second dielectric layer having a thickness of 40 nm was then formed on the surface of the decomposition reaction layer by a sputtering process using a target of a mixture of ZnS and $SiO_2$. The mole ratio of ZnS to $SiO_2$ in the mixture of ZnS and $SiO_2$ contained in the second dielectric layer was 85:15.

Further, a light absorption layer having a thickness of 60 nm was formed on the surface of the second dielectric layer by a sputtering process using $Ag_{6.0}In_{5.5}Sb_{60.8}Te_{28.7}$ as a target, The composition of the light absorption layer was $Ag_{6.0}In_{5.5}Sb_{60.8}Te_{28.7}$ I terms of an atomic ratio and the same as that of the target.

Furthermore, a third dielectric layer having a thickness of 100 nm was then formed on the surface of the light absorption layer by a sputtering process using a target of a mixture of ZnS and $SiO_2$. The mole ratio of ZnS to $SiO_2$ in the mixture of ZnS and $SiO_2$ contained in the third dielectric layer was 85:15.

Thus, the optical recording disc sample # 1 was fabricated.

Then, the optical recording disc sample # 1 was set in an optical recording medium evaluation apparatus for emitting a laser beam having a wavelength of 635 nm and the laser beam was irradiated using an objective lens having an NA (numerical aperture) of 0.60 onto the optical recording disc sample # 1 from the side of the light transmissible substrate, thereby forming a recording mark in the decomposition reaction layer of the optical recording disc sample # 2 so that the length of the recording mark was 200 nm shorter than the resolution limit of 265 nm under the following conditions.

Recording linear velocity: 6.0 m/sec
Recording power: 10.0 mW
Recording regions: on-groove recording After forming the recording mark, data recorded in the optical recording disc sample # 1 were reproduced using the same optical recording medium evaluation apparatus at a readout linear velocity of 0.5 m/sec and a C/N ratio of a reproduced signal was measured. Here, a read power of the laser beam was set to 0.8 mW. The results of the measurement are indicated by a curve A in FIG. 10.

Then, data recorded in the optical recording disc sample # 1 were reproduced while varying the read power of the laser beam from 0.8 mW by about 0.2 mW and a C/N ratio of a reproduced signal was measured.

Figure 10:
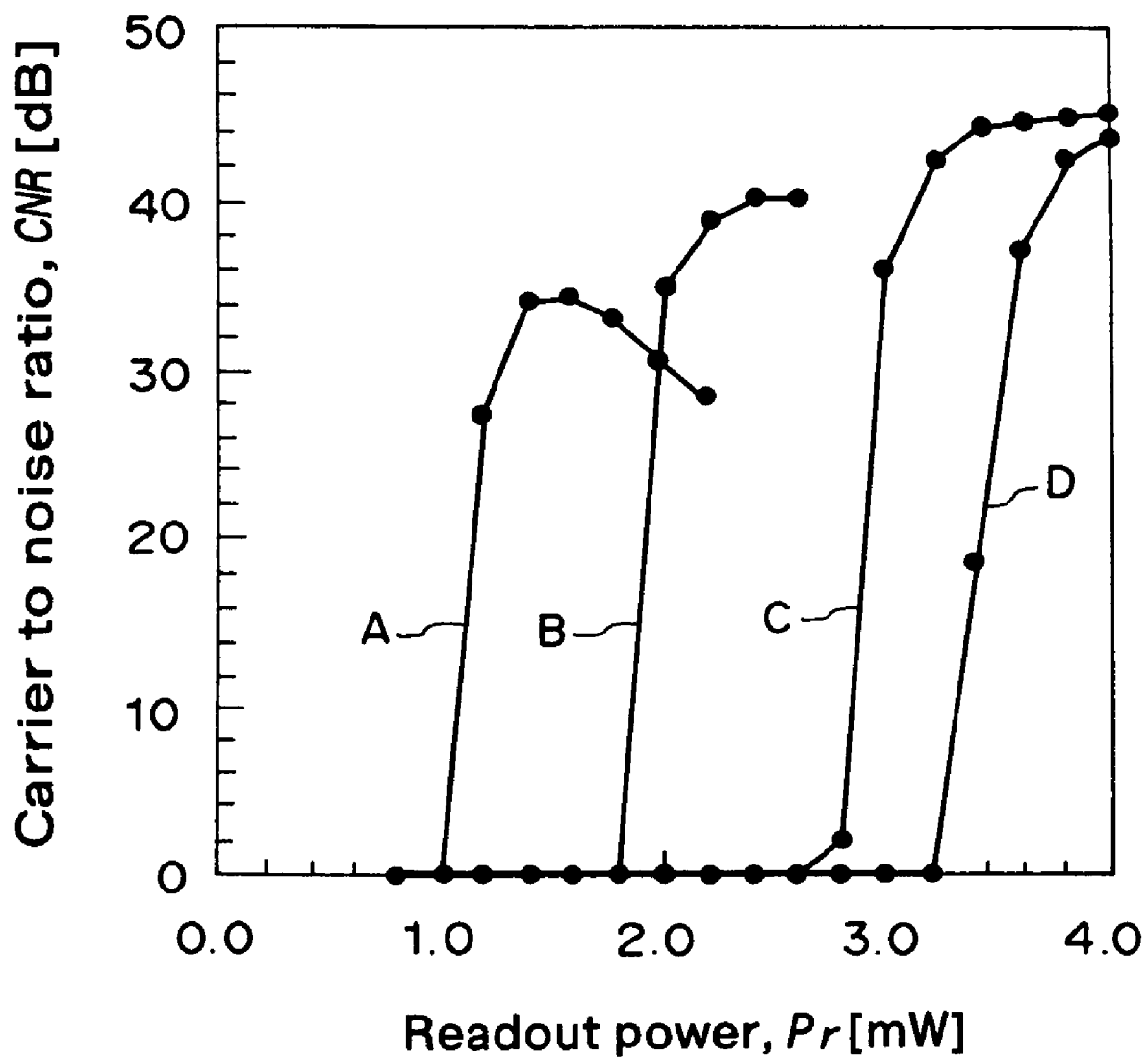
FIG. 10 is a graph showing the relationship between the C/N ratio of a reproduced signal obtained by reproducing data recorded in an optical recording disc sample # 1 and the read power of the laser beam.

The results of the measurement are indicated by a curve A in FIG. 10.

Then, a recording mark having a length of 200 nm was formed using the above mentioned optical recording medium evaluating apparatus on a different track of the optical recording disc sample # 1 from the track on which data had been recorded, thereby recording data thereon. Further, data recorded in the optical recording disc 1 were reproduced using the above mentioned optical recording medium evaluating apparatus at a readout linear velocity of 2.0 m/sec while varying the read power of the laser beam from 0.8 mW by about 0.2 mW and a C/N ratio of a reproduced signal was measured.

The results of the measurement are indicated by a curve B in FIG. 10.

Similarly, data recorded in the optical recording disc 1 were reproduced using the above mentioned optical recording medium evaluating apparatus at a readout linear velocity of 5.0 m/sec and a readout linear velocity of 7.0 m/sec while varying the read power of the laser beam from 0.8 mW by about 0.2 mW and C/N ratios of reproduced signals were measured.

The results of the measurement are indicated by a curve C and curve D in FIG. 10, respectively.

As shown in the curve A of FIG. 10, in the case of reproducing data from the optical recording disc sample # 1 at the readout linear velocity of 0.5 m/sec, it was found that when data recorded in the optical recording disc sample # 1 were reproduced by irradiating the laser beam having a read power equal to or lower than about 1.0 mW thereonto, the C/N ratio of the reproduced signal was 0 dB and data recorded in the optical recording disc sample # 1 could not be reproduced, when the read power of the laser beam irradiated onto the optical recording disc sample # 1 exceeded about 1.0 mW, the C/N ratio of the reproduced signal began to increase, and when the read power of the laser beam irradiated onto the optical recording disc sample # 1 became equal to about 1.4 mW, the C/N ratio of the reproduced signal reached a local maximal value. It was further found that when the read power of the laser beam irradiated onto the optical recording disc sample # 1 exceeded about 1.4 mW, the C/N ratio of the reproduced signal became lower as the read power of the laser beam increased.

Furthermore, as shown in the curve B of FIG. 10, in the case of reproducing data from the optical recording disc sample # 1 at the readout linear velocity of 2.0 m/sec, it was found that when data recorded in the optical recording disc sample # 1 were reproduced by irradiating the laser beam having a read power equal to or lower than about 1.8 mW thereonto, the C/N ratio of the reproduced signal was 0 dB and data recorded in the optical recording disc sample # 1 could not be reproduced, when the read power of the laser beam irradiated onto the optical recording disc sample # 1 exceeded about 1.8 mW, the C/N ratio of the reproduced signal began to increase, and when the read power of the laser beam irradiated onto the optical recording disc sample # 1 became equal to about 2.2 mW, the gradient of increase in the C/N ratio of the reproduced signal became small.

Moreover, as shown in the curve C of FIG. 10, in the case of reproducing data from the optical recording disc sample # 1 at the readout linear velocity of 5.0 m/sec, it was found that when data recorded in the optical recording disc sample # 1 were reproduced by irradiating the laser beam having a read power equal to or lower than about 2.6 mW thereonto, the C/N ratio of the reproduced signal was 0 dB and data recorded in the optical recording disc sample # 1 could not be reproduced, when the read power of the laser beam irradiated onto the optical recording disc sample # 1 exceeded about 2.6 mW, the C/N ratio of the reproduced signal began to increase, and when the read power of the laser beam irradiated onto the optical recording disc sample # 1 became equal to about 3.4 mW, the gradient of increase in the C/N ratio of the reproduced signal became small.

Further, as shown in the curve D of FIG. 10, in the case of reproducing data from the optical recording disc sample # 1 at the readout linear velocity of 7.0 m/sec, it was found that when data recorded in the optical recording disc sample # 1 were reproduced by irradiating the laser beam having a read power equal to or lower than about 2.6 mW thereonto, the C/N ratio of the reproduced signal was 0 dB and data recorded in the optical recording disc sample # 1 could not be reproduced, when the read power of the laser beam irradiated onto the optical recording disc sample # 1 exceeded about 3.2 mW, the C/N ratio of the reproduced signal began to increase, and when the read power of the laser beam irradiated onto the optical recording disc sample # 1 became equal to about 4.0 mW, the gradient of increase in the C/N ratio of the reproduced signal became small.

Then, the relationship between the optimum read powers of the laser beam at various readout linear velocities and the readout linear velocities were estimated based on the results of the measurement shown in FIG. 10. Here, in the case of reproducing data from the optical recording disc sample # 1 at the readout linear velocity of 0.5 m/sec, about 1.4 mW, at which the C/N ratio of the reproduced signal became a local maximal value, was determined as the optimum level of the read power of the laser beam and in the cases of reproducing data from the optical recording disc sample # 1 at the readout linear velocities of 2.0 m/sec, 5.0 m/sec and 7.0 m/sec, about 2.2 mW, about 3.4 mW and about 4.0 mW, at each of which the gradient of increase in the C/N ratio of the reproduced signal became small, were determined as the optimum levels of the read power of the laser beam, respectively.

Figure 11:
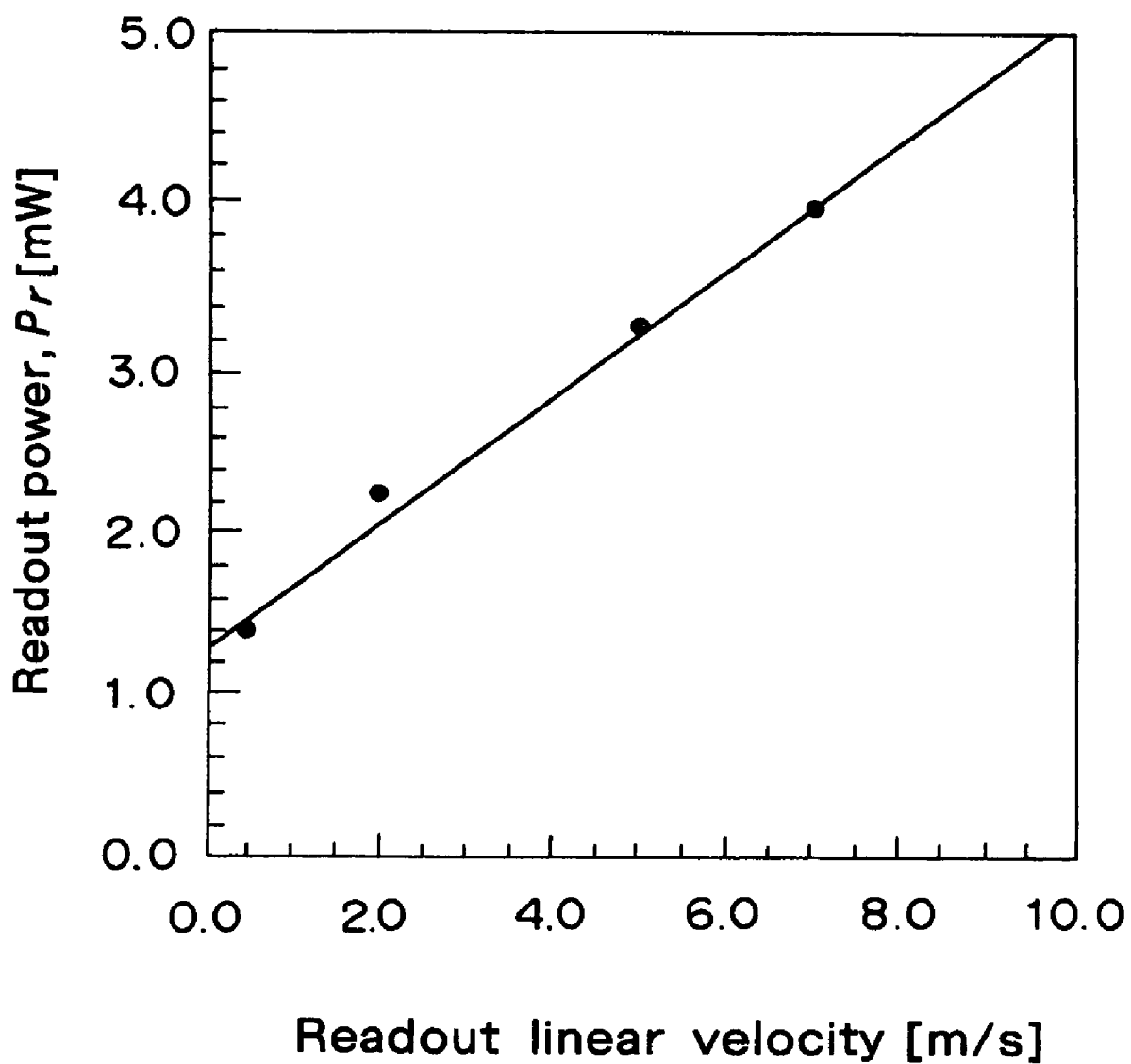
FIG. 11 is a graph showing a relationship between optimum read powers of a laser beam and readout linear velocities in an optical recording disc sample # 1.

A graph indicating the relationship between the optimum read powers of the laser beam at various readout linear velocities and the readout linear velocities is shown in FIG. 11.

As apparent from FIG. 11, it was found that in the case of changing the readout linear velocity when data were to be reproduced from the optical recording disc sample # 1, the optimum read power of the laser beam became higher as the readout linear velocity was higher and that there was a linear relationship between the optimum read powers of the laser beam at various readout linear velocities and the readout linear velocities.

Working Example 2

An optical recording disc sample # 2 was fabricated in the following manner.

A polycarbonate substrate having a thickness of 1.1 mm and a diameter of 120 mm was first set in a sputtering apparatus and a reflective layer having a thickness of 20 nm was formed on the surface of the polycarbonate substrate by a sputtering process using Pt as a target.

A third dielectric layer having a thickness of 100 nm was then formed on the surface of the reflective layer by a sputtering process using a target of a mixture of ZnS and $SiO_2$. The mole ratio of ZnS to $SiO_2$ in the mixture of ZnS and $SiO_2$ contained in the third dielectric layer was 80:20.

Further, a light absorption layer having a thickness of 60 nm was formed on the surface of the third dielectric layer by a sputtering process using $Ag_{6.0}In_{5.5}Sb_{60.8}Te_{28.7}$ as a target. The composition of the light absorption layer was $Ag_{6.0}In_{5.5}Sb_{60.8}Te_{28.7}$I terms of an atomic ratio and the same as that of the target.

Furthermore, a second dielectric layer having a thickness of 60 nm was then formed on the surface of the light absorption layer by a sputtering process using a target of a mixture of ZnS and $SiO_2$. The mole ratio of ZnS to $SiO_2$ in the mixture of ZnS and $SiO_2$ contained in the second dielectric layer was 80:20.

Then, a decomposition reaction layer containing platinum oxide as a primary component and having a thickness of 4 nm was formed on the surface of the second dielectric layer by a sputtering process using a mixed gas of Ar gas and oxygen gas as a sputtering gas and a Pt target.

Further, a first dielectric layer having a thickness of 70 nm was then formed on the surface of the decomposition reaction layer by a sputtering process using a target of a mixture of ZnS and $SiO_2$. The mole ratio of ZnS to $SiO_2$ in the mixture of ZnS and $SiO_2$ contained in the first dielectric layer was 80:20.

Finally, a resin solution prepared by dissolving an acrylic ultraviolet ray curable resin in a solvent was applied onto the surface of the first dielectric layer using a spin coating method to form a coating layer and an ultraviolet ray was irradiated onto the coating layer to cure the acrylic ultraviolet ray curable resin, thereby forming a light transmission layer having a thickness of 100 μm.

Thus, the optical recording disc sample # 2 was fabricated.

Then, the optical recording disc sample # 2 was set in an optical recording medium evaluation apparatus for emitting a laser beam having a wavelength of 405 nm and the laser beam was irradiated using an objective lens having an NA (numerical aperture) of 0.85 onto the optical recording disc sample # 2 from the side of the light transmission layer, thereby forming a recording mark in the decomposition reaction layer of the optical recording disc sample # 1 so that the length of the recording mark was 75 nm shorter than the resolution limit of 120 nm under the following conditions.

Recording linear velocity: 6.0 m/sec
Recording power: 8.0 mW
Recording regions: on-groove recording After forming the recording mark, data recorded in the optical recording disc sample # 2 were reproduced using the same optical recording medium evaluation apparatus at a readout linear velocity of 3 m/sec and a C/N ratio of a reproduced signal was measured. Here, a read power of the laser beam was set to 1.2 mW. The results of the measurement are indicated by a curve E in FIG. 12.

Then, data recorded in the optical recording disc sample # 2 were reproduced while varying the read power of the laser beam from 1.2 mW by about 0.2 mW and a C/N ratio of a reproduced signal was measured.

Figure 12:
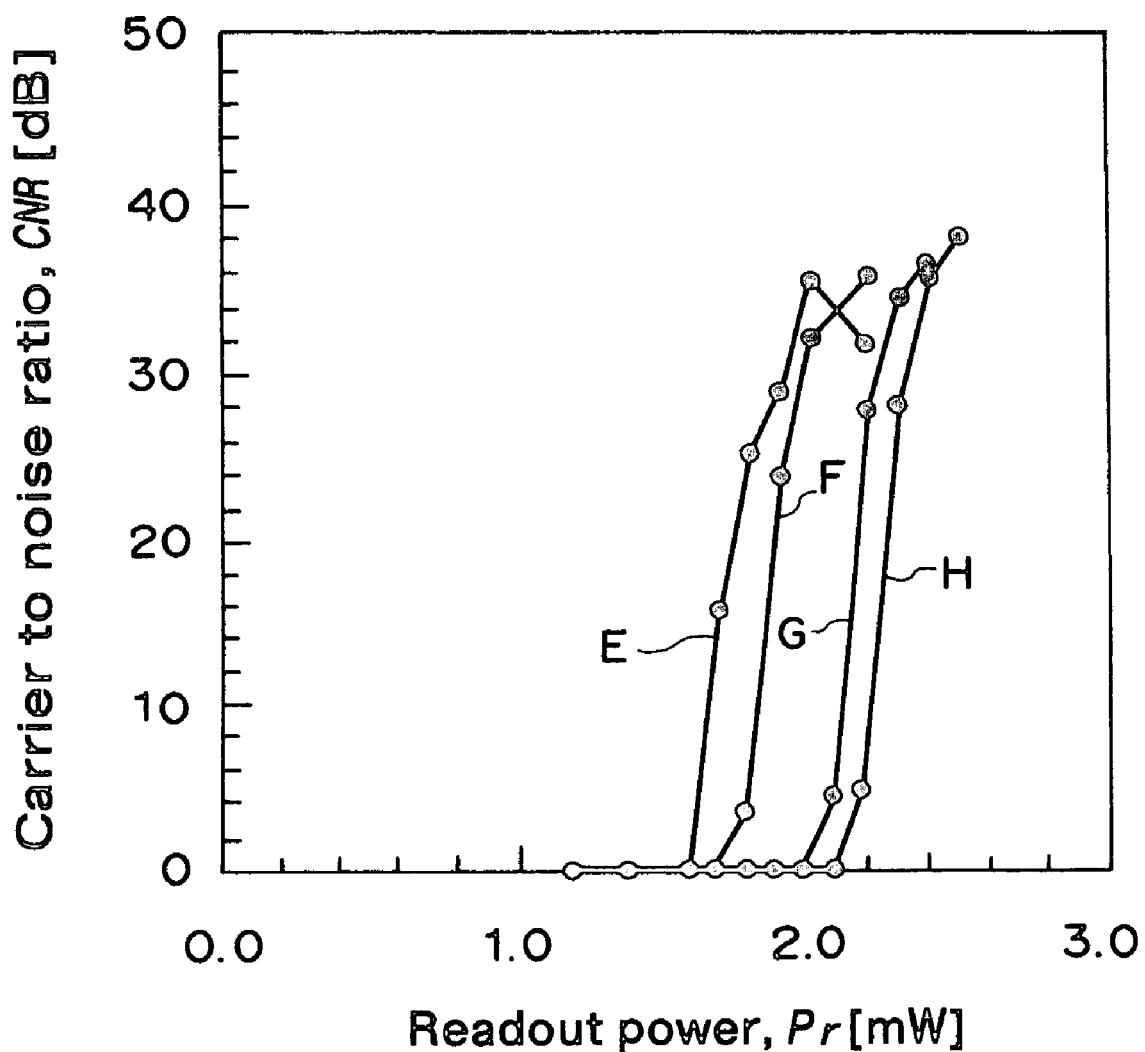
FIG. 12 is a graph showing the relationship between the C/N ratio of a reproduced signal obtained by reproducing data recorded in an optical recording disc sample # 2 and the read power of the laser beam.

The results of the measurement are indicated by a curve E in FIG. 12.

Then, a recording mark having a length of 75 nm was formed using the above mentioned optical recording medium evaluating apparatus on a different track of the optical recording disc sample # 2 from the track on which data had been recorded, thereby recording data thereon. Further, data recorded in the optical recording disc # 2 were reproduced using the above mentioned optical recording medium evaluating apparatus at a readout linear velocity of 5.0 m/sec while varying the read power of the laser beam from 1.2 mW by about 0.2 mW and a C/N ratio of a reproduced signal was measured.

The results of the measurement are indicated by a curve F in FIG. 12.

Similarly, data recorded in the optical recording disc sample # 2 were reproduced using the above mentioned optical recording medium evaluating apparatus at a readout linear velocity of 8.0 m/sec and a readout linear velocity of 10.0 m/sec while varying the read power of the laser beam from 1.2 mW by about 0.2 mW and C/N ratios of reproduced signals were measured.

The results of the measurement are indicated by a curve G and curve H in FIG. 12, respectively.

As shown in the curve E of FIG. 12, in the case of reproducing data from the optical recording disc sample # 2 at the readout linear velocity of 3.0 m/sec, it was found that when data recorded in the optical recording disc sample # 2 were reproduced by irradiating the laser beam having a read power equal to or lower than about 1.6 mW thereonto, the C/N ratio of the reproduced signal was 0 dB and data recorded in the optical recording disc sample # 2 could not be reproduced, when the read power of the laser beam irradiated onto the optical recording disc sample # 2 exceeded about 1.6 mW, the C/N ratio of the reproduced signal began to increase, and when the read power of the laser beam irradiated onto the optical recording disc sample # 2 became equal to about 2.0 mW, the C/N ratio of the reproduced signal reached a local maximal value. It was further found that when the read power of the laser beam irradiated onto the optical recording disc sample # 2 exceeded about 2.0 mW, the C/N ratio of the reproduced signal became lower as the read power of the laser beam increased.

Furthermore, as shown in the curve F of FIG. 12, in the case of reproducing data from the optical recording disc sample # 2 at the readout linear velocity of 5.0 m/sec, it was found that when data recorded in the optical recording disc sample # 2 were reproduced by irradiating the laser beam having a read power equal to or lower than about 1.6 mW thereonto, the C/N ratio of the reproduced signal was 0 dB and data recorded in the optical recording disc sample # 2 could not be reproduced, when the read power of the laser beam irradiated onto the optical recording disc sample # 2 exceeded about 1.6 mW, the C/N ratio of the reproduced signal began to increase, and when the read power of the laser beam irradiated onto the optical recording disc sample # 2 became equal to about 2.2 mW, the gradient of increase in the C/N ratio of the reproduced signal became small.

Moreover, as shown in the curve G of FIG. 12, in the case of reproducing data from the optical recording disc sample # 2 at the readout linear velocity of 8.0 m/sec, it was found that when data recorded in the optical recording disc sample # 2 were reproduced by irradiating the laser beam having a read power equal to or lower than about 2.0 mW thereonto, the C/N ratio of the reproduced signal was 0 dB and data recorded in the optical recording disc sample # 2 could not be reproduced, when the read power of the laser beam irradiated onto the optical recording disc sample # 2 exceeded about 2.0 mW, the C/N ratio of the reproduced signal began to increase, and when the read power of the laser beam irradiated onto the optical recording disc sample # 2 became equal to about 2.4 mW, the gradient of increase in the C/N ratio of the reproduced signal became small.

Further, as shown in the curve H of FIG. 12, in the case of reproducing data from the optical recording disc sample # 2 at the readout linear velocity of 10.0 m/sec, it was found that when data recorded in the optical recording disc sample # 2 were reproduced by irradiating the laser beam having a read power equal to or lower than about 2.1 mW thereonto, the C/N ratio of the reproduced signal was 0 dB and data recorded in the optical recording disc sample # 2 could not be reproduced, when the read power of the laser beam irradiated onto the optical recording disc sample # 2 exceeded about 2.1 mW, the C/N ratio of the reproduced signal began to increase and when the read power of the laser beam irradiated onto the optical recording disc sample # 2 became equal to about 2.5 mW, the gradient of increase in the C/N ratio of the reproduced signal became small.

Then, similarly to in Working Example 1, the relationship between the optimum read powers of the laser beam at various readout linear velocities and the readout linear velocities were estimated based on the results of the measurement shown in FIG. 12. Here, in the case of reproducing data from the optical recording disc sample # 2 at the readout linear velocity of 3.0 m/sec, about 2.0 mW at which the C/N ratio of the reproduced signal became a local maximal value was determined as the optimum level of the read power of the laser beam and in the cases of reproducing data from the optical recording disc sample # 2 at the readout linear velocity of 5.0 m/sec, 8.0 m/sec and 10.0 m/sec, about 2.2 mW, about 2.4 mW and about 2.5 mW at each of which the gradient of increase in the C/N ratio of the reproduced signal became small were determined as the optimum levels of the read power of the laser beam, respectively.

Figure 13:
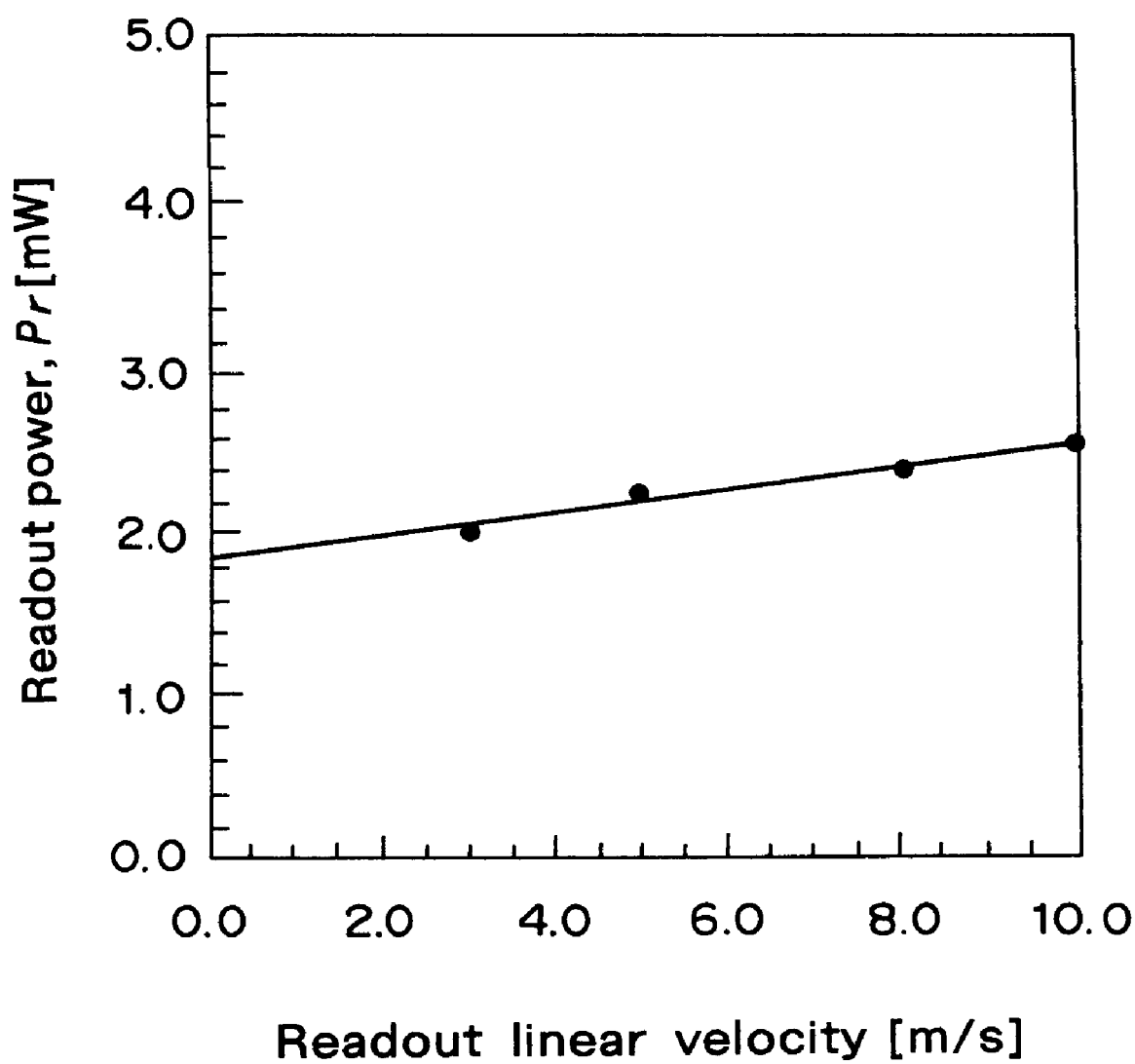
FIG. 13 is a graph showing a relationship between optimum read powers of a laser beam and readout linear velocities in an optical recording disc sample # 2.

A graph indicating the relationship between the optimum read powers of the laser beam at various readout linear velocities and the readout linear velocities is shown in FIG. 13.

As apparent from FIG. 13, it was found that in the case of changing the readout linear velocity when data were to be reproduced from the optical recording disc sample # 2, similarly to FIG. 11, the optimum read power of the laser beam became higher as the readout linear velocity was higher and that there was a linear relationship between the optimum read powers of the laser beam at various readout linear velocities and the readout linear velocities.

The present invention has thus been shown and described with reference to a specific embodiment and working examples. However, it should be noted that the present invention is in no way limited to the details of the described arrangements but changes and modifications may be made without departing from the scope of the appended claims.

For example, in the above described preferred embodiments, although the optical recording disc 1 is rotated at a constant angular velocity under the CAV control, the optical recording disc 1 may be rotated at a constant linear velocity under the CLV (Constant Linear Velocity) control.

Further, in the above described preferred embodiments, although whether or not the signal characteristics of a reproduced signal satisfy reference conditions is judged by calculating the resolution from a reproduced signal obtained by reproducing the test signal and judging whether or not the resolution satisfies reference conditions, it is not absolutely necessary to judge whether or not the signal characteristics of a reproduced signal satisfy reference conditions using the resolution of a reproduced signal and it is possible to judge whether or not the signal characteristics of a reproduced signal satisfy reference conditions using parameters other than the resolution obtained from a reproduced signal obtained by reproducing the test signal.

Furthermore, in the above described preferred embodiments, when the optimum read power of the laser beam L at the linear velocity V1 and the optimum read power of the laser beam L at the linear velocity V2 are to be determined, the optimum recording powers of the laser beam L are first determined prior to determining the optimum read powers of the laser beam L, but it is not absolutely necessary to first determine the optimum recording powers of the laser beam L and the optimum recording powers of the laser beam L may be determined after determining the optimum read powers of the laser beam L.

Moreover, in the above described preferred embodiments, although the optical recording disc 1 is constituted by laminating the decomposition reaction layer 7, the second dielectric layer 6 and the light absorption layer 5 from the light incidence plane of the laser beam L in this order, application of the present invention is not limited to only the case of determining the read power of a laser beam L to be irradiated onto the optical recording disc 1 having such configuration for reproducing data recorded therein. The optical recording disc may be constituted by laminating the decomposition reaction layer 7, the second dielectric layer 6 and the light absorption layer 5 from the opposite side of the light incidence plane of the laser beam L in this order or laminating a light absorption layer, a dielectric layer, a decomposition reaction layer, a dielectric layer and a light absorption layer from the light incidence plane of the laser beam L in this order, for example. In other words, in the present invention, it is sufficient for the optical recording disc to include a multilayered body formed by at least a decomposition reaction layer and a light absorption layer so as to sandwich a dielectric layer.

Furthermore, although in the above described preferred embodiments, the optical recording disc 1 includes the reflective layer 3 formed on surface of the support substrate 2, it is not absolutely necessary to provide the reflective layer 3 and the reflective layer 3 may be omitted. In such a case, the third dielectric layer 4 serves to protect not only the support substrate 2 but also the light absorption layer 5 formed on the third dielectric layer 4.

Further, in the above described preferred embodiments, although the recommended recording power Pw1' the recommended read power Pr1', the recommended recording power Pw2', the recommended read power Pr2', and the recording linear velocities V1 and V2 are recorded in advance in the form of wobbles or pre-pits in the optical recording disc 1 as data for setting recording and reproducing conditions, it is not absolutely necessary to record in advance the data for setting recording and reproducing conditions in a form of wobbles or pre-pits in the optical recording disc 1 and it is possible to record ID data for identifying the kind of an optical recording disc in the optical recording disc 1 in a form of wobbles or pre-pits and store the recommended recording power Pw1', the recommended read power Pr1', the recommended recording power Pw2', the recommended read power Pr2', and the recording linear velocities V1 and V2 in the data recording and reproducing apparatus 50 in association with the ID data.

According to the present invention, it is possible to provide a method for reproducing data recorded in an optical recording disc which can record data therein and reproduce data therefrom even in the case where the lengths of a recording mark and a blank region between neighboring recording marks which constitute the data are shorter than the resolution limit and whose storage capacity can be markedly increased.

Further, according to the present invention, it is possible to provide an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

The invention claimed is:

1. A method for reproducing data recorded in an optical recording disc comprising a multi-layered body formed by forming a decomposition reaction layer containing noble metal oxide as a primary component and a light absorption layer so as to sandwich at least a dielectric layer therebetween by irradiating a laser beam onto the optical recording disc formed with a recording mark train including at least one of a recording mark having a length shorter than a resolution limit and a blank region having a length shorter than the resolution limit therein, the method comprising steps of:

determining an optimum read power of the laser beam at a first readout linear velocity and determining an optimum read power of the laser beam at a second readout linear velocity higher than the first readout linear velocity prior to reproducing data from the optical recording medium; and determining an optimum read power of the laser beam at a readout linear velocity between the first readout linear velocity and the second readout linear velocity based on the optimum read power of the laser beam at the first readout linear velocity and the optimum read power of the laser beam at the second readout linear velocity when data are to be reproduced from the optical recording disc; and changing a power of the laser beam in accordance with a readout linear velocity at which data are to be reproduced from the optical recording disc.

2. A method for reproducing data in accordance with claim 1, wherein the power of the laser beam is increased as the readout linear velocity becomes higher when data are to be reproduced from.

3. A method for reproducing data in accordance with claim 1, further comprising steps of: recording test data in the optical recording disc, reproducing the test data recorded in the optical recording disc, judging whether or not signal characteristics of a reproduced signal obtained by reproducing the test data satisfy reference conditions, and determining the optimum read power of the laser beam at the first readout linear velocity and the optimum read power of the laser beam at the second readout linear velocity based on the result of the judgment.

4. A method for reproducing data in accordance with claim 2, further comprising steps of: recording test data in the optical recording disc, reproducing the test data recorded in the optical recording disc, judging whether or not signal characteristics of a reproduced signal obtained by reproducing the test data satisfy reference conditions, and determining the optimum read power of the laser beam at the first readout linear velocity and the optimum read power of the laser beam at the second readout linear velocity based on the result of the judgment.

5. An apparatus for recording and reproducing data adapted for irradiating a laser beam onto an optical recording disc comprising:

a multi-layered body formed by forming a decomposition reaction layer containing noble metal oxide as a primary component and a light absorption layer so as to sandwich at least a dielectric layer therebetween, having thereon a recording mark train including at least one of a recording mark having a length shorter than a resolution limit and a blank region having a length shorter than the resolution limit therein, thereby having recorded data therein, the apparatus for recording and reproducing data comprising:

an irradiating means for irradiating the laser beam onto the optical recording disc; and a control means for controlling a power of the laser beam, the control means being constituted so as to determine an optimum read power of the laser beam at a first readout linear velocity and determine an optimum read power of the laser beam at a second readout linear velocity higher than the first readout linear velocity prior to reproducing data from the optical recording medium, and determine an optimum read power of the laser beam at a readout linear velocity between the first readout linear velocity and the second readout linear velocity based on the optimum read power of the laser beam at the first readout linear velocity and the optimum read power of the laser beam at the second readout linear velocity when data are to be reproduced from the optical recording disc, thereby changing a read power of the laser beam in accordance with a readout linear velocity at which data are to be reproduced from the optical recording disc.

6. An apparatus for recording and reproducing data in accordance with claim 5, wherein the control means is constituted so as to increase the power of the laser beam as the readout linear velocity becomes higher when data are to be reproduced from the optical recording disc.

7. An apparatus for recording and reproducing data in accordance with claim 5, wherein the control means is constituted so as to form recording test data in the optical recording disc, reproduce the test data, judge whether or not signal characteristics of a reproduced signal obtained by reproducing the test data satisfy reference conditions, and determine the optimum read power of the laser beam at the first readout linear velocity and the optimum read power of the laser beam at the second readout linear velocity based on the result of the judgment.

8. An apparatus for recording and reproducing data in accordance with claim 6, wherein the control means is constituted so as to form recording test data in the optical recording disc, reproduce the test data, judge whether or not signal characteristics of a reproduced signal obtained by reproducing the test data satisfy reference conditions, and determine the optimum read power of the laser beam at the first readout linear velocity and the optimum read power of the laser beam at the second readout linear velocity based on the result of the judgment.

* * * * *